(12) United States Patent
Sato

(10) Patent No.: US 8,357,883 B2
(45) Date of Patent: Jan. 22, 2013

(54) INDUCTION HEATING SYSTEM FOR A MOTOR-DRIVEN VEHICLE

(75) Inventor: Takayuki Sato, Higashihiroshima (JP)

(73) Assignee: Mazda Motor Corporation (JP)

( * ) Notice: Subject to any disclaimer, the term of this patent is extended or adjusted under 35 U.S.C. 154(b) by 495 days.

(21) Appl. No.: 12/405,667

(22) Filed: Mar. 17, 2009

(65) Prior Publication Data

US 2009/0236329 A1    Sep. 24, 2009

(30) Foreign Application Priority Data

Mar. 18, 2008  (JP) ................................ 2008-069227
Mar. 18, 2008  (JP) ................................ 2008-069228
Mar. 18, 2008  (JP) ................................ 2008-069229

(51) Int. Cl.
*H05B 6/04* (2006.01)
(52) U.S. Cl. ........................................ 219/660; 219/661
(58) Field of Classification Search .................. 219/660, 219/661, 663, 635, 601, 628, 677; 322/32, 322/34, 29, 16, 333
See application file for complete search history.

(56) References Cited

U.S. PATENT DOCUMENTS

| | | | |
|---|---|---|---|
| 3,581,489 A | | 6/1971 | Camin et al. |
| 4,114,009 A | * | 9/1978 | Kiuchi et al. ................. 219/622 |
| 5,200,678 A | * | 4/1993 | Tokashiki et al. ........ 318/568.13 |
| 5,689,174 A | * | 11/1997 | Pacheco, Sr. .................... 322/16 |
| 6,696,675 B2 | * | 2/2004 | Morrison ...................... 219/661 |
| 2003/0029863 A1 | | 2/2003 | Morrison |
| 2003/0217876 A1 | | 11/2003 | Severinsky et al. |

FOREIGN PATENT DOCUMENTS

| | | |
|---|---|---|
| DE | 1216128 B | 5/1996 |
| JP | H08-126121 A | 5/1996 |
| JP | 2002-359978 A | 12/2002 |
| JP | 2003-230203 A | 8/2003 |
| JP | 2006-151199 A | 6/2006 |
| WO | 2007091749 A1 | 8/2007 |

OTHER PUBLICATIONS

Extended European Search Report dated Jul. 2, 2009; Application No. 09155238.0-2423.
Japanese Office Action "Notice of Reasons for Rejection" dated Jun. 7, 2011; Japanese Patent Application No. 2008-069227 with translation.
Japanese Office Action "Notice of Reasons for Rejection" dated Jun. 28, 2011; Japanese Patent Application No. 2008-069228 with translation.

\* cited by examiner

*Primary Examiner* — Henry Yuen
*Assistant Examiner* — Phuong Nguyen
(74) *Attorney, Agent, or Firm* — Studebaker & Brackett PC; Donald R. Studebaker

(57) ABSTRACT

Disclosed is an induction heating system for a motor-driven vehicle (VC), which comprises a polyphase-type AC motor (1) adapted to drive the vehicle (VC), an electrical storage device (10) which stores an electric power to be supplied to the AC motor (1), a DC-AC converter (11) adapted to convert a direct current from the electrical storage device (10) into an alternating current and supply the alternating current to the AC motor (1), and an induction heating coil (C or C1 to C3) adapted to receive a supply of the alternating current from the DC-AC converter (11), to inductively heat a target component mounted to the vehicle (VC). The induction heating system of the present invention can efficiently inductively heat the target component without providing an additional converter exclusively for induction heating.

8 Claims, 45 Drawing Sheets

FIG.11 TURNING ON Tr21,Tr12 AND Tr32

INDUCTION HEATING SYSTEM FOR A MOTOR-DRIVEN VEHICLE

BACKGROUND OF THE INVENTION

1. Field of the Invention

The present invention relates to an induction heating system for inductively heating a given component mounted to a motor-driven vehicle

2. Description of the Background Art

In a vehicle, such as an automobile, there is a frequent need for heating (warming) a given component mounted thereto (such a component required to be heated will hereinafter be referred to as "target component"). For example, it is required to heat an air-conditioning heater core as a target component to warm a vehicle-interior space, and, in an engine-equipped vehicle, to heat an exhaust gas purifying catalyst as a target component to quickly activate the catalyst. In this connection, JP 2006-151199A discloses an air-conditioning system comprising a heater (auxiliary heater) which is disposed immediately downstream of a heater core and provided with a direct current (DC) resistor (heat-generating element) to secondarily heat air-conditioning air.

As one type of vehicle, there has been known a vehicle adapted to be driven by a motor (hereinafter referred to as "motor-driven vehicle"). It has also been known to use an alternating current (AC) motor as the vehicle-driving motor in view of energy efficiency and other factors. In the motor-driven vehicle using an AC motor, a DC-AC converter (i.e., inverter) is provided to convert a direct current from an electrical storage device into an alternating current and supply the alternating current to the AC motor.

The above heater using the DC resistor (heat-generating element) has extremely poor energy efficiency. Although it is contemplated to heat the heater by means of induction heating, this approach gives rise to a need for additionally providing a DC-AC converter for converting a direct current into an alternating current, which causes a problem about an increase in cost and the number of components.

SUMMARY OF THE INVENTION

In view of the above circumstances, it is an object of the present invention to provide an induction heating system for a motor-driven vehicle, which is capable of inductively heating a target component without providing an additional DC-AC converter exclusively for induction heating.

In order to achieve the above object, the present invention provides an induction heating system for inductively heating a target component mounted to a motor-driven vehicle. The induction heating system comprises a polyphase-type alternating current motor adapted to drive the vehicle, an electrical storage device which stores an electric power to be supplied to the alternating current motor, a DC-AC converter adapted to convert a direct current from the electrical storage device into an alternating current and supply the alternating current to the alternating current motor, and an induction heating coil adapted to receive a supply of the alternating current from the DC-AC converter, to inductively heat the target component.

DESCRIPTION OF THE PREFERRED EMBODIMENTS

With reference to the drawings, the present invention will now be described based on various embodiments thereof.

First Embodiment

Figure 1:
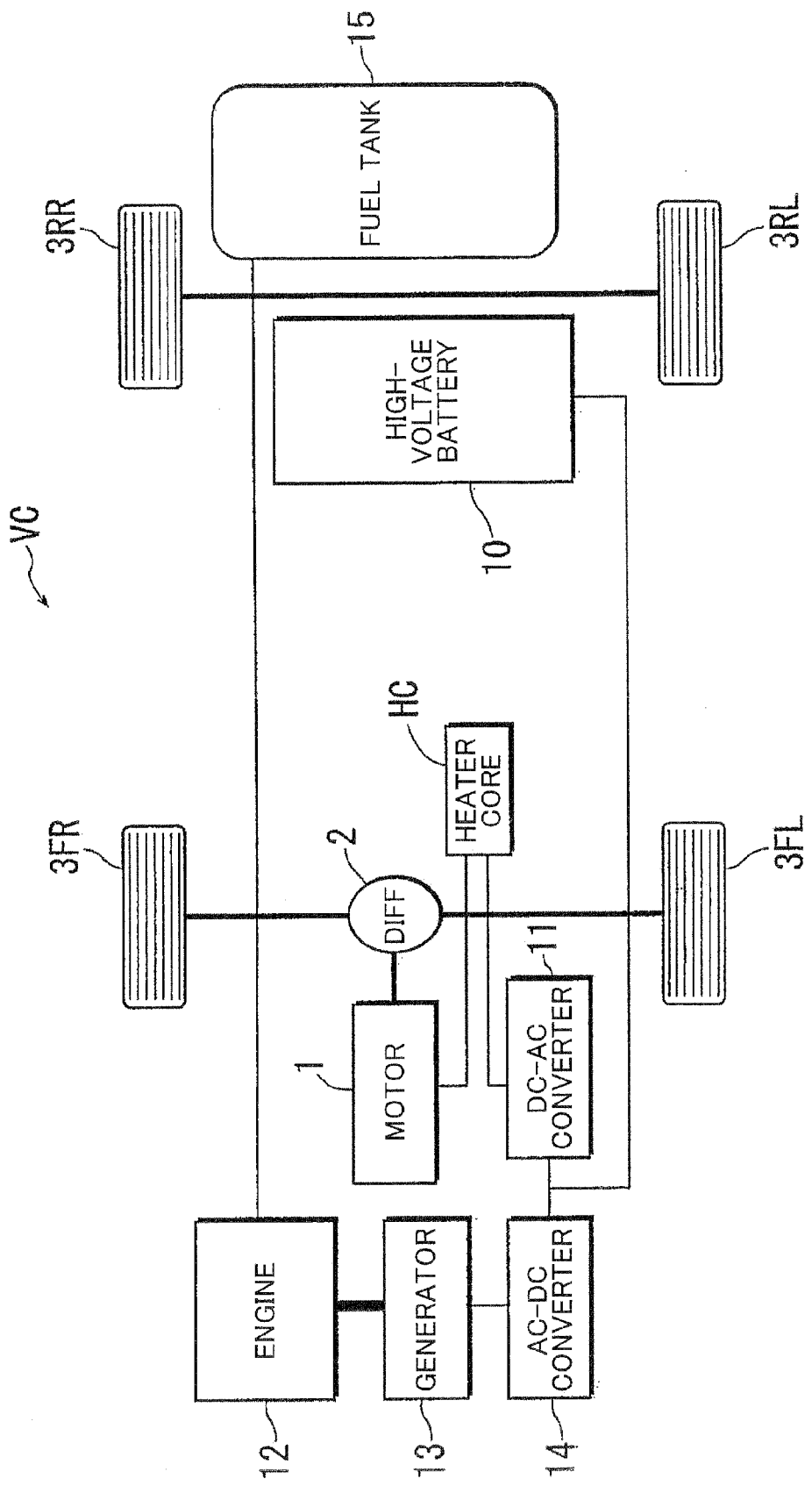
FIG. 1 is a general system diagram showing one example of a motor-driven vehicle employing an induction heating system of the present invention.

FIG. 1 shows one example of a motor-driven vehicle employing an induction heating system of the present invention. As shown in FIG. 1, a vehicle VC as a motor-driven vehicle comprises a polyphase (in this example, three-phase) type alternating current (AC) motor 1. The AC motor 1 is adapted to drive right and left front road wheels 3FR, 3FL through a differential gear mechanism 2. In this vehicle VC, each of right and left rear road wheels 3RR, 3RL is a non-driven road wheel.

The reference numeral 10 indicates a high-voltage battery 10 which serves as an electric storage device. A direct current from the high-voltage battery 10 is converted into an alternating current by a DC-AC converter (i.e., inverter) 11, and the converted alternating current is supplied to the AC motor 1. The reference numeral 12 indicates an internal combustion engine (hereinafter referred to simply as "engine"), and the reference numeral 13 indicates an AC generator adapted to be driven by the engine 12. An AC power generated by the AC generator 13 is converted into a DC power by an AC-DC converter (i.e., converter) 14, and the DC power is supplied to the high-voltage battery 10. Simultaneously, the DC power output from the AC-DC converter 14 is converted into an AC power by the DC-AC converter 11, and the AC power is supplied to the AC motor 1. The AC motor 1 is associated with a heater core HC as a target component equipped with an after-mentioned induction heating coil. This structure will be described in detail later.

For example, a mode for supplying an AC power (alternating current) to the AC motor 1 includes a first mode using only the AC generator 13, a second mode using only the high-voltage battery 10, and a third mode using both the high-voltage battery 10 and the AC generator 13. The three modes are controllably switched therebetween, depending on a driving state of the vehicle VC and a charged state of the high-voltage battery 10. In this example, the engine 12 is a gasoline-fueled type, and the vehicle VC is equipped with a fuel tank 15 for reserving gasoline. The engine 12 is a reciprocating type.

Figure 2:
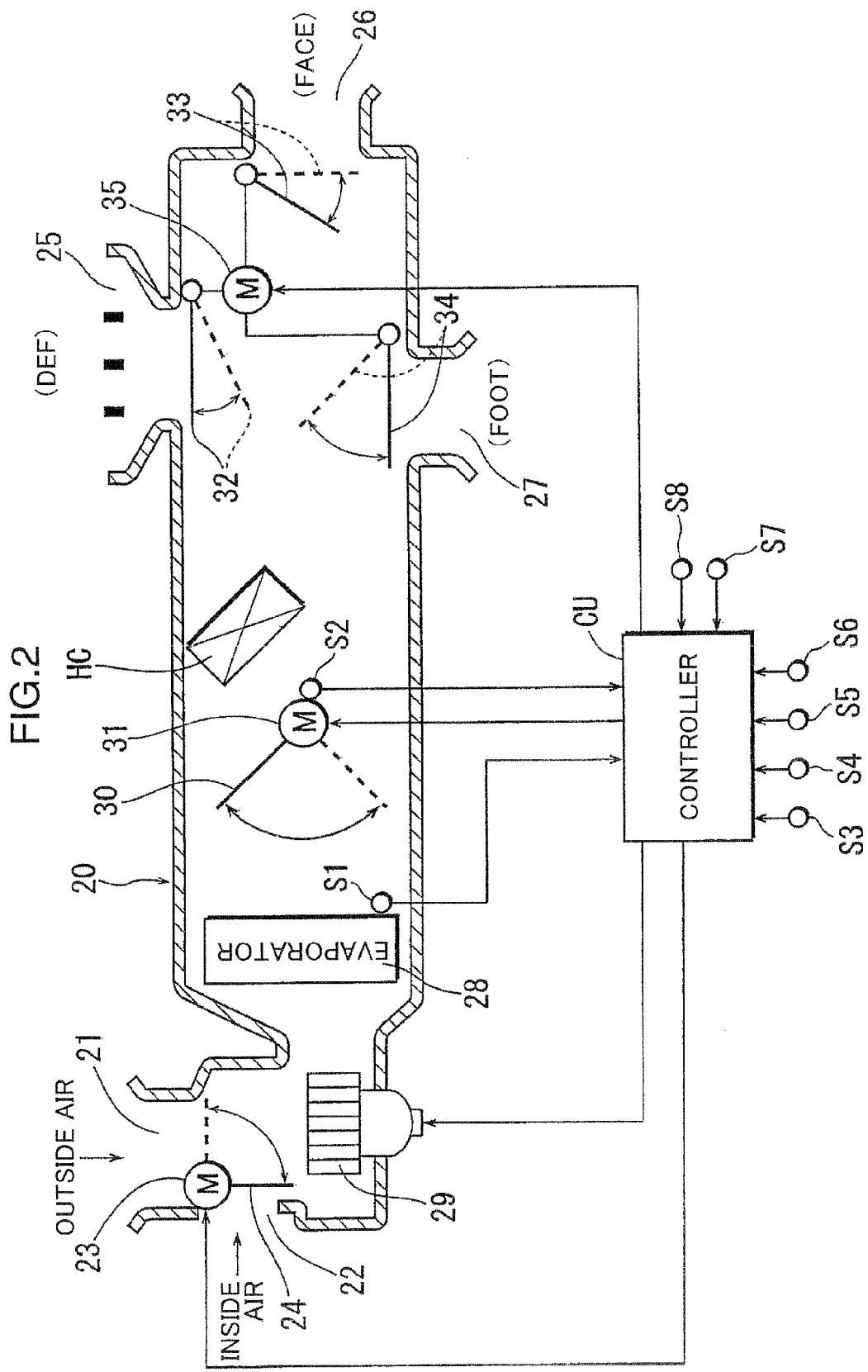
FIG. 2 is a schematic diagram showing one example of an air-conditioning system equipped in the vehicle.

FIG. 2 shows one example of an air-conditioning system equipped in the vehicle VC. In FIG. 2, the reference numeral 20 indicates an air-conditioning duct which has an outside-air inlet 21 and an inside-air inlet 22 formed in one of opposite ends thereof. An inlet damper 24 is disposed at the one end, and adapted to be swingingly moved by a drive motor 23, so that only one of the two inlets 21, 22 is selectively opened. Further, first to third air outlets 25 to 27 for air-conditioning are formed in the other end of the air-conditioning duct 20. The first outlet 25 is used for a defroster. The second outlet 26 is used for blowing air-conditioning air toward and around a face of a front seat occupant of the vehicle VC, and the third outlet 27 is used for blowing air-conditioning air toward feet of the front seat occupant.

The air-conditioning duct 20 houses an evaporator 28 and the aforementioned heater core HC at respective positions between the one end with the inlets 21, 22 and the other end with the outlets 25 to 27, in such a manner that the heater core HC is disposed downstream of the evaporator 28. The air-conditioning duct 20 further houses an air-conditioning fan 29 at a position between the inlets 21, 22 and the evaporator 28, and an air-mixing damper 30 at a position between the evaporator 28 and the heater core HC. The air-mixing damper 30 is adapted to be swingingly moved to a desired position stepwise or continuously by a drive motor 31, and is arranged so as to controllably guide air cooled by the evaporator 28 to change a ratio between a volume of the air to be introduced into the heater core HC and a volume of the remaining air to be bypassed relative to the heater core HC.

A positional relationship between the heater core HC, the air-mixing damper 30 and the first to third outlets 25 to 27 is set to allow air-conditioning air passing through the heater core HC to primarily flow toward the first and second outlets 25, 26, and allow air-conditioning air bypassing the heater core HC to primarily flow toward the third outlet 27. The first outlet 25, the second outlet 26 and the third outlet 27 are selectively opened and closed by a first outlet damper 32, a second outlet damper 33 and a third outlet damper 34, respectively. The first to third outlet dampers 32 to 34 are adapted to be swingingly moved by a drive motor 35 in a synchronous manner, wherein, when an automatic air-conditioning mode is selected by an occupant, opening/closing of each of the outlet dampers 32 to 34 is automatically adjusted.

In FIG. 2, the reference code CU indicates a controller (control unit) configured using a microcomputer. The controller CU is operable to perform a control operation of driving (a drive motor for) the air-conditioning fan 29 to change a total volume of air-conditioning air, a control operation of driving the drive motor 31 to change the position of the air-mixing damper 30, and a control operation of driving each of the drive motors 23 and the drive motor 35 to controllably open and close a corresponding one of the inlet damper 24 and the group of outlet dampers 32 to 34. For these control operations, signals from sensors/switch S1 to S8 are input into the controllers CU. The sensor S1 is a temperature sensor for detecting a temperature of air just after passing through the evaporator 28. The sensor S2 is a position sensor (potentiometer) for detecting a drive position of the drive motor 31, i.e., a position of the air-mixing damper 30. The sensor S3 is a temperature sensor for detecting a temperature of inside air (vehicle-interior space). The sensor S4 is a temperature sensor for detecting a temperature of outside air. The sensor S5 is a temperature sensor for detecting a temperature of coolant of the engine 12. The sensor S6 is a solar sensor for detecting an amount of solar radiation entering the vehicle-interior space. The switch S7 is a switch adapted to be manually operated by an occupant in order to set a target temperature of a vehicle-interior space. The sensor S8 is an ignition sensor for detecting an ON/OFF state of an ignition system for starting up the engine 12. The controller CU is operable, based on signals input thereinto from the sensors/switch S1 to S8, to control each of the dampers 24, 30, 32 to 34, as described above.

Figure 3:
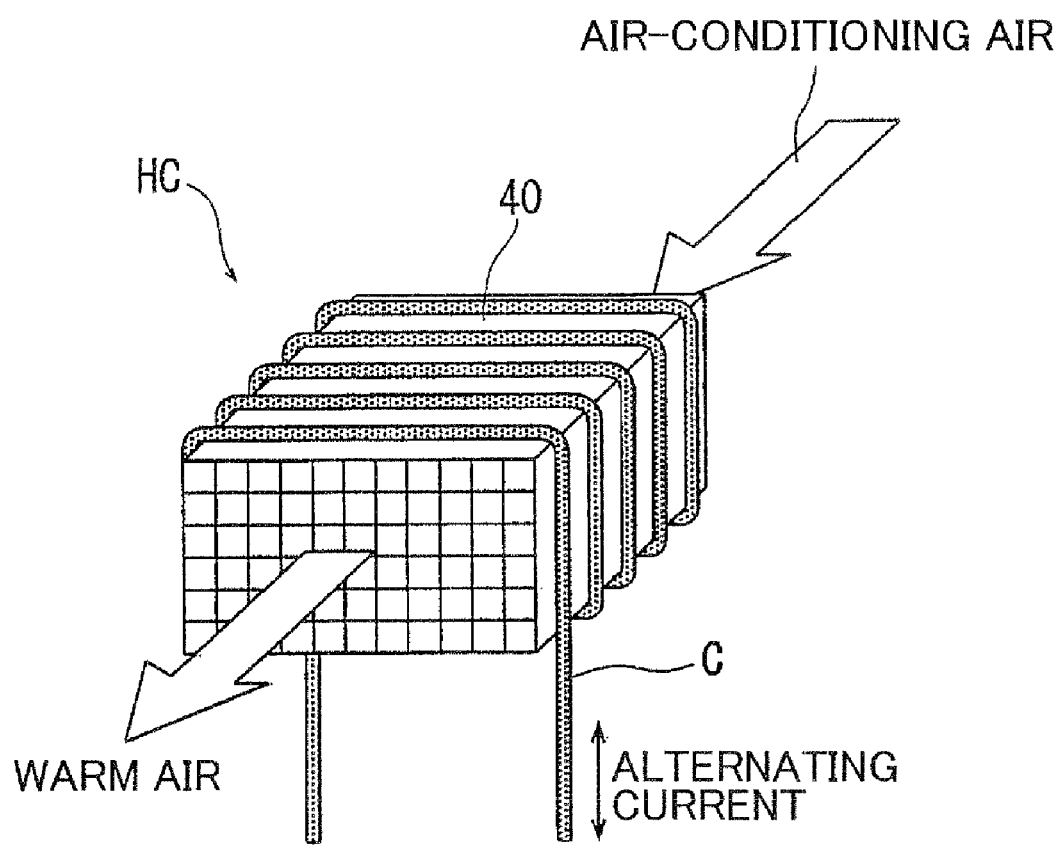
FIG. 3 is a fragmentary perspective view showing a heater core in the air-conditioning system in FIG. 2, which is to be inductively heated by an induction heating system according to a first embodiment of the present invention.

FIG. 3 shows the heater core HC. The heater core HC comprises a casing 40 which has therein an air passage for allowing air-conditioning air to pass therethrough, a coolant passage for allowing the coolant of the engine 12 to flow therethrough, and a large number of heat-transfer fins arranged in the coolant passage. That is, the heater core HC is adapted to warm air-conditioning air passing through the air passage of the casing 4, by utilizing a high-temperature of the coolant flowing through the coolant passage, in a heat-exchanging manner. Further, an induction heating coil C is wound around an outer peripheral surface of the casing 40. The casing 40 is made of an electrically conductive material (preferably, a material having a relatively large electrical resistivity, e.g., a metal material, such as stainless steel). Thus, when an alternating current is applied to the induction heating coil C, the casing 40 will be inductively heated. That is, in addition to the warming based on the heat exchange with the coolant, the air-conditioning air passing through the casing 40 is additionally warmed through the induction heating. Instead of winding the induction heating coil C around the outer peripheral surface of the casing 40, the induction heating coil C may be arranged along only a bottom of the casing 40 to cause the casing 40 to be inductively heated (an induction heating effect can be obtained by arranging the casing 40 in an effectively reachable range of magnetic field lines generated from the induction heating coil C).

Figure 4:
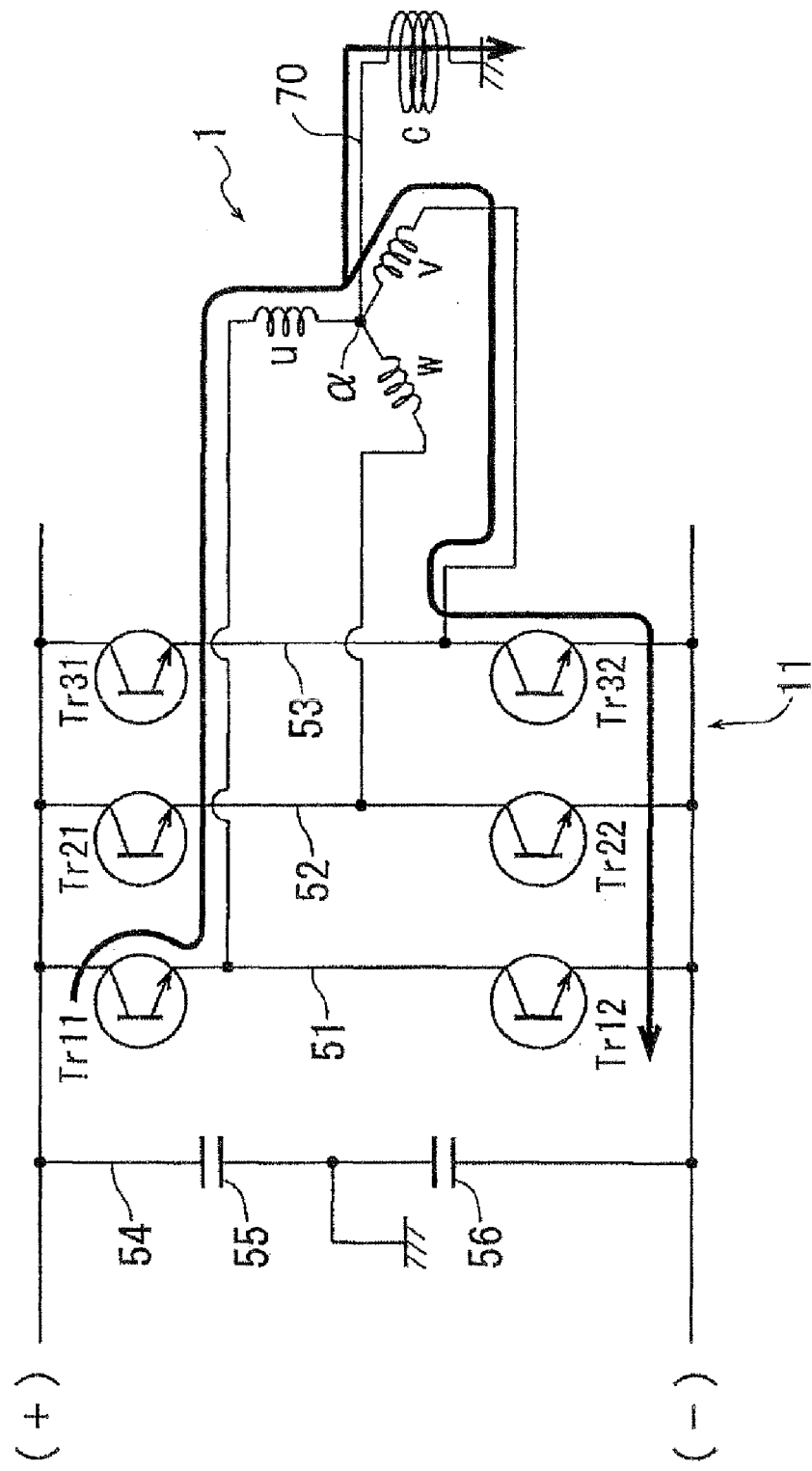
FIG. 4 is an explanatory diagram showing a connection between an AC motor, an induction heating coil and a DC-AC converter, and one example of an energization mode for rotationally driving the AC motor, in the induction heating system according to the first embodiment.

FIG. 4 shows one example of a connection between the electromagnetic coils U, V, W of the three-phase AC motor 1, the induction heating coil C and the DC-AC converter 11. The DC-AC converter 11 has four lines 51, 52, 53, 54 connected in parallel to a positive (+) terminal and a negative (−) terminal of the high-voltage battery 10. An input-side switching element Tr11 and an output-side switching element Tr12 are inserted in series in the line 51. An input-side switching element Tr21 and an output-side switching element Tr22 are inserted in series in the line 52. An input-side switching element Tr31 and an output-side switching element Tr32 are inserted in series in the line 53. Two capacitors 55, 56 are inserted in series in the line 54, and the line 54 is connected to ground (earth) at a position between the two capacitors 55, 56.

In FIG. 4, the reference code α indicates a neutral point. One end of each of the electromagnetic coils U, V, W of the AC motor 1 is connected to the neutral point α. The other end of the electromagnetic coil U is connected to the line 51 at a position between the switching elements Tr11, Tr12. The other end of the electromagnetic coil W is connected to the line 52 at a position between the switching elements Tr21, Tr22. The other end of the electromagnetic coil V is connected to the line 53 at a position between the switching elements Tr31, Tr32.

The induction heating coil C is connected to the neutral point α. Specifically, a line 70 is provided to extend from the neutral point α, and the induction heating coil C is inserted in the line 70. The line 70 has a distal end connected to ground, on the side opposite to one end connected to the neutral point α. As is commonly known, when the AC motor 1 is rotationally driven (i.e., when the electromagnetic coils U, V, W are energized), the neutral point α has a given potential difference with respect to a ground potential, and therefore the induction heating coil C is also energized.

Figure 5:
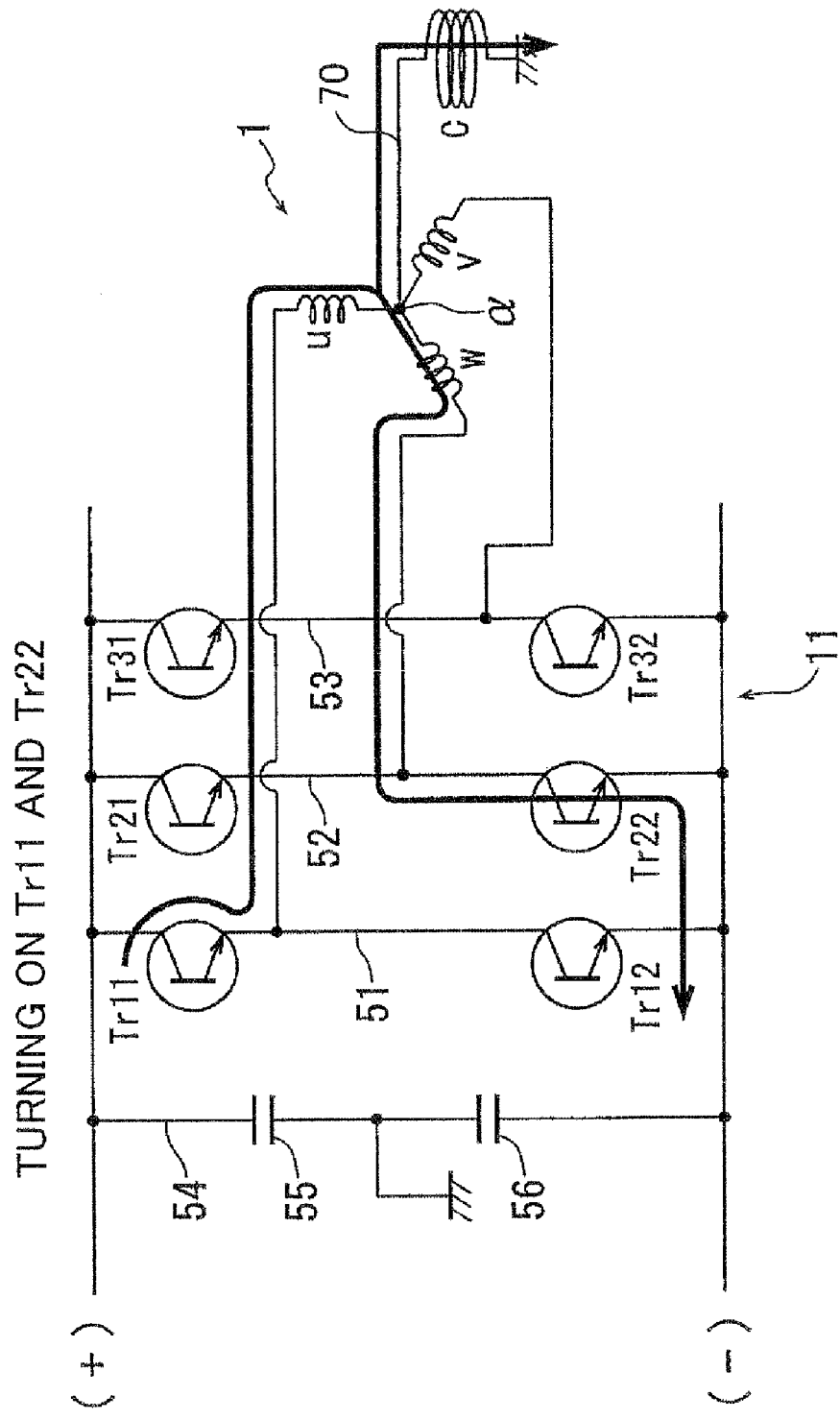
FIG. 5 is an explanatory diagram showing another example of the energization mode for rotationally driving the AC motor, in the induction heating system according to the first embodiment.
Figure 6:
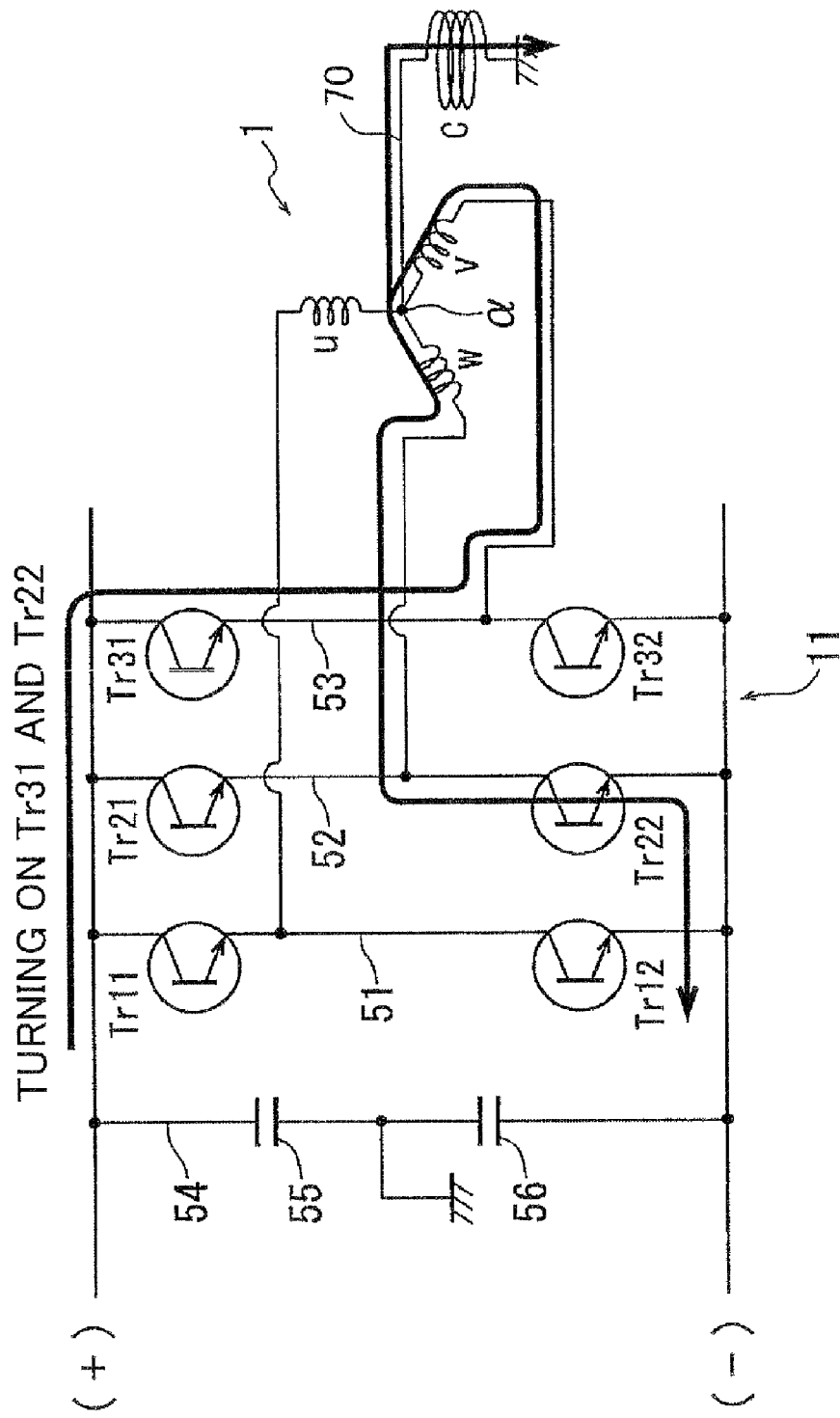
FIG. 6 is an explanatory diagram showing another example of the energization mode for rotationally driving the AC motor, in the induction heating system according to the first embodiment.
Figure 7:
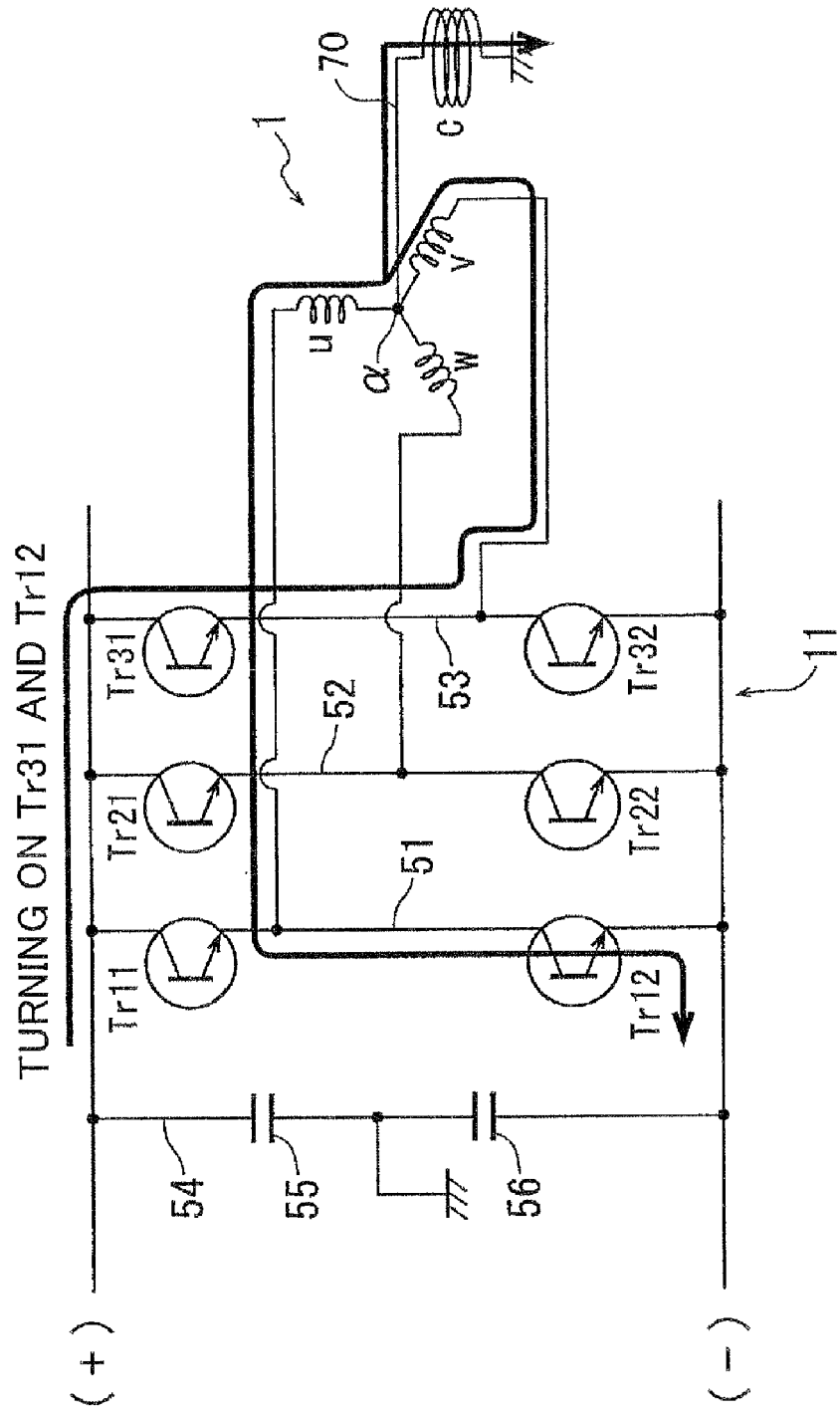
FIG. 7 is an explanatory diagram showing another example of the energization mode for rotationally driving the AC motor, in the induction heating system according to the first embodiment.
Figure 8:
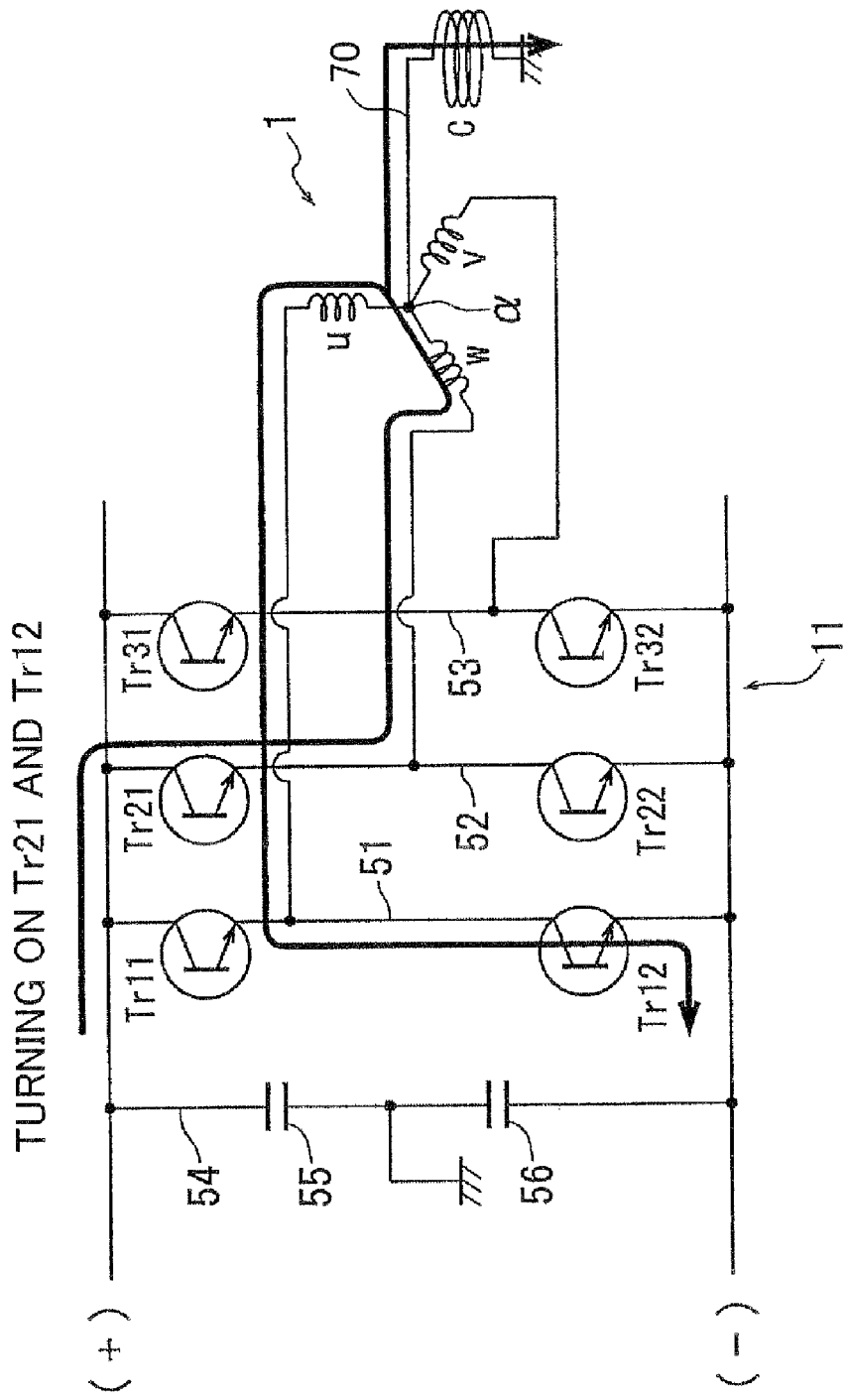
FIG. 8 is an explanatory diagram showing another example of the energization mode for rotationally driving the AC motor, in the induction heating system according to the first embodiment.
Figure 9:
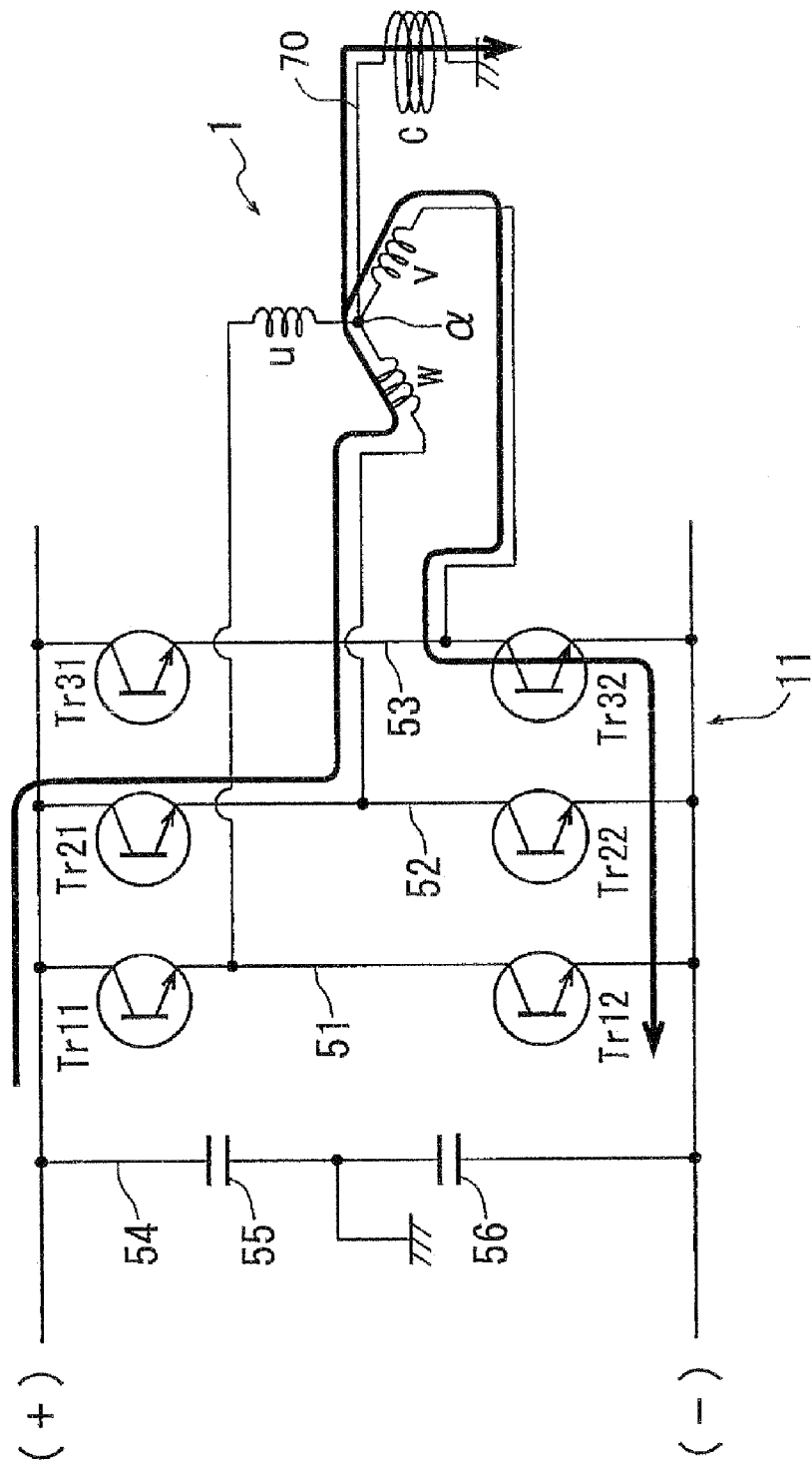
FIG. 9 is an explanatory diagram showing another example of the energization mode for rotationally driving the AC motor, in the induction heating system according to the first embodiment.

In an operation of rotating the AC motor 1 in a normal direction (i.e., in a direction for driving the vehicle VC forwardly), two of the six switching elements Tr11 to Tr32 are sequentially turned on, for example, in respective modes illustrated in FIGS. 4, 5, 6, 7, 8 and 9 in this order, and, after the mode in FIG. 9, re-turned on in order from the mode in FIG. 4 (in an operation of rotating the AC motor 1 in a reverse direction, two of the six switching elements Tr11 to Tr32 may be turned on in the converse order). Specifically, FIG. 4 shows a mode where the two switching elements Tr11, Tr32 are turned on. In this mode, a current flows through the electromagnetic coils U, V, and simultaneously flows through the induction heating coil C. FIG. 5 shows a mode where the two switching elements Tr11, Tr22 are turned on. In this mode, a current flows through the electromagnetic coils U, W, and simultaneously flows through the induction heating coil C. FIG. 6 shows a mode where the two switching elements Tr31, Tr22 are turned on. In this mode, a current flows through the electromagnetic coils V, W, and simultaneously flows through the induction heating coil C. FIG. 7 shows a mode where the two switching elements Tr31, Tr12 are turned on. In this mode, a current flows through the electromagnetic coils V, U, and simultaneously flows through the induction heating coil C. FIG. 8 shows a mode where the two switching elements Tr21, Tr12 are turned on. In this mode, a current flows through the electromagnetic coils W, U, and simultaneously flows through the induction heating coil C. FIG. 9 shows a mode where the two switching elements Tr21, Tr32 are turned on. In this mode, a current flows through the electromagnetic coils W, V, and simultaneously flows through the induction heating coil C. In this way, two of the electromagnetic coils U, V, W are sequentially energized to allow a rotor (not shown) of the AC motor 1 to be rotationally driven. During the rotational driving of the AC motor 1, the induction heating coil C is also energized, so that the heater core HC is inductively heated.

Figure 10:
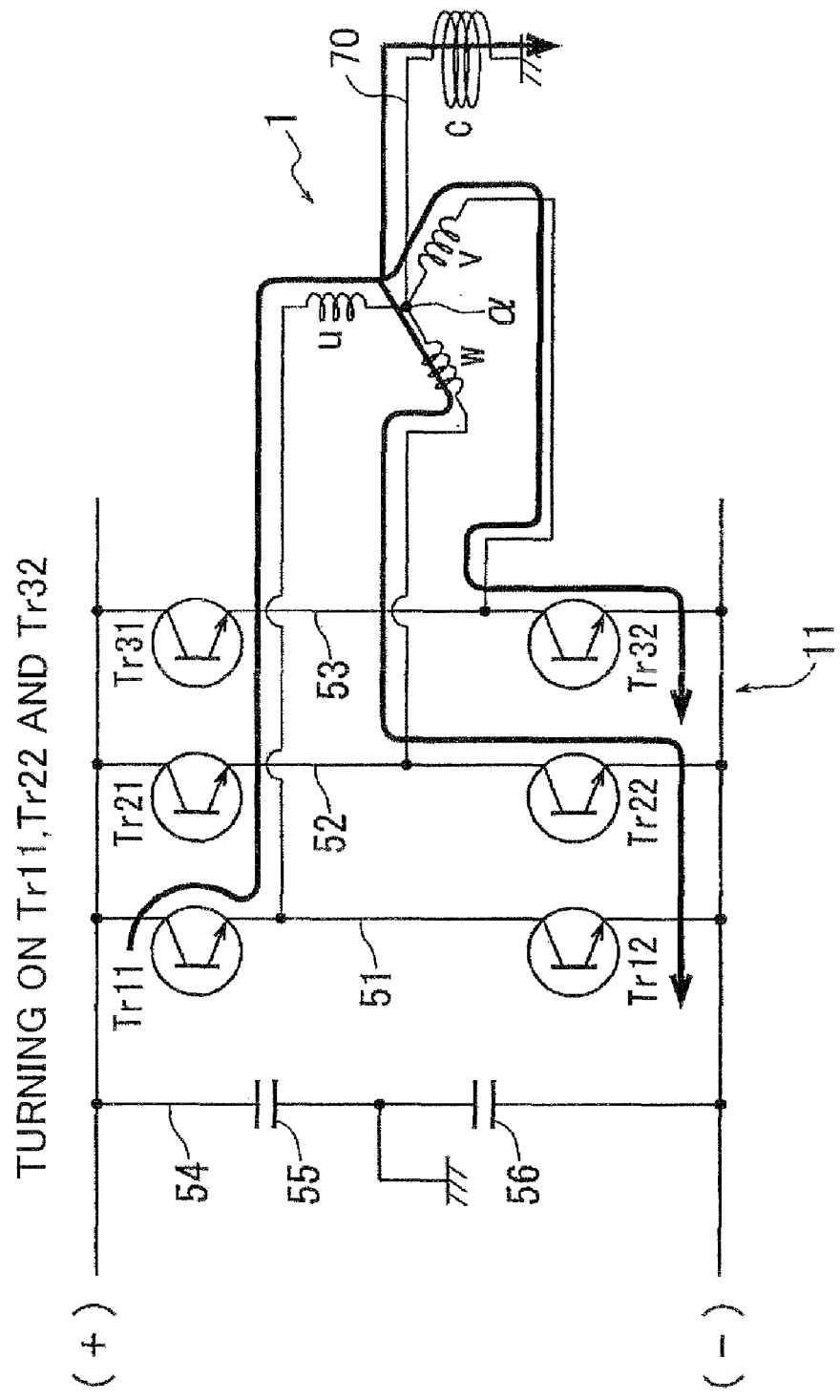
FIG. 10 is an explanatory diagram showing one example of an energization mode for setting the AC motor in a servo lock state, in the induction heating system according to the first embodiment.
Figure 11:
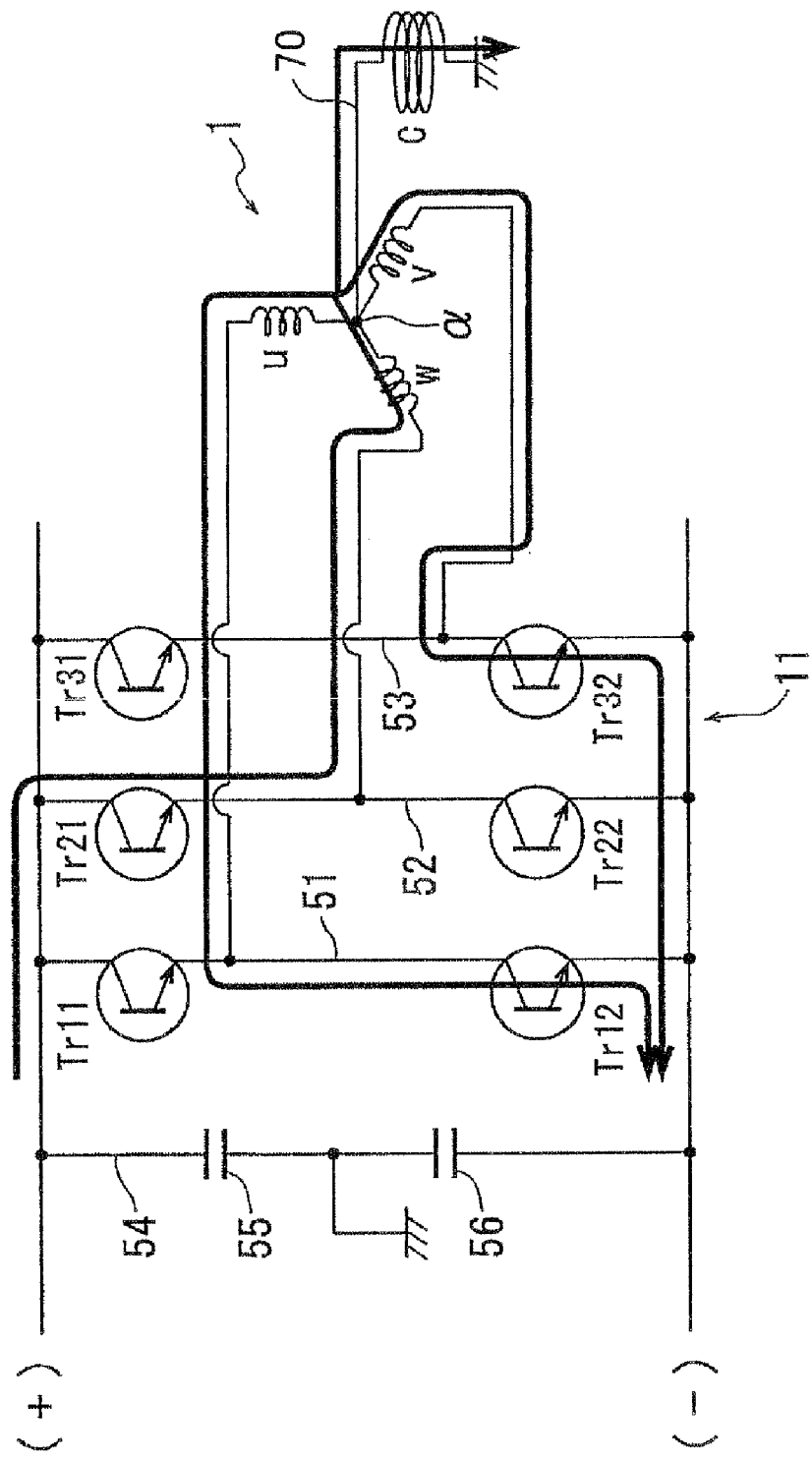
FIG. 11 is an explanatory diagram showing another example of the energization mode for setting the AC motor in the servo lock state, in the induction heating system according to the first embodiment.
Figure 12:
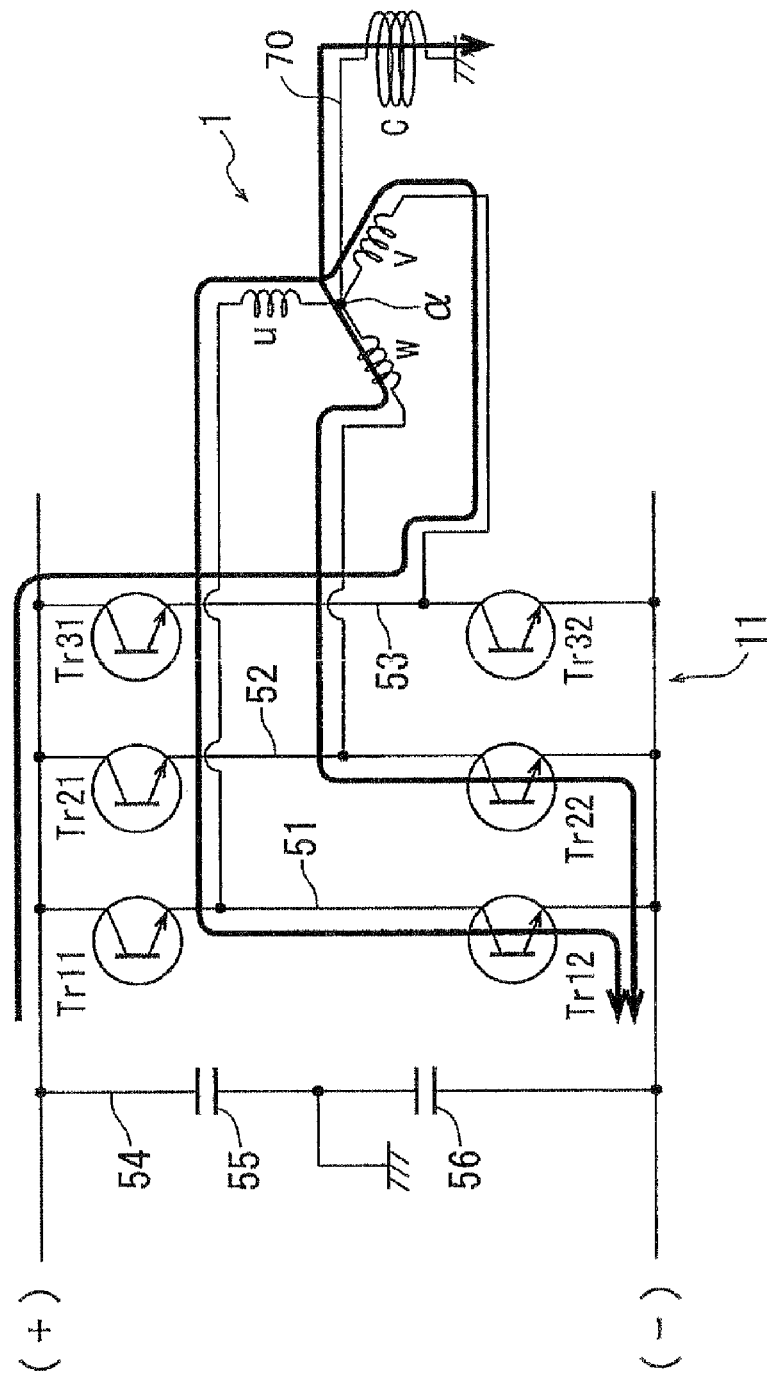
FIG. 12 is an explanatory diagram showing another example of the energization mode for setting the AC motor in the servo lock state, in the induction heating system according to the first embodiment.

FIGS. 10 to 12 show three modes for energizing the induction heating coil C while setting the AC motor 1 in a servo lock state to stop the rotational driving thereof. In the first embodiment, the servo lock state is achieved by energizing all the electromagnetic coils U, V, W. Specifically, FIG. 10 shows a mode where the three switching elements Tr11, Tr22, Tr32 are turned on. FIG. 11 shows a mode where the three switching elements Tr21, Tr12, Tr32 are turned on. FIG. 12 shows a mode where the three switching elements Tr31, Tr12, Tr22 are turned on. Instead of the modes illustrated in FIGS. 10 to 12, the servo lock state may be achieved by appropriately switching between the energization modes illustrated in FIGS. 4 to 9 depending on a position of the rotor, in such a manner as to prevent the rotor of the AC motor 1 from being rotationally driven. In the servo lock state, the induction heating coil C can also be energized to cause the heater core HC to be inductively heated.

Figure 13:
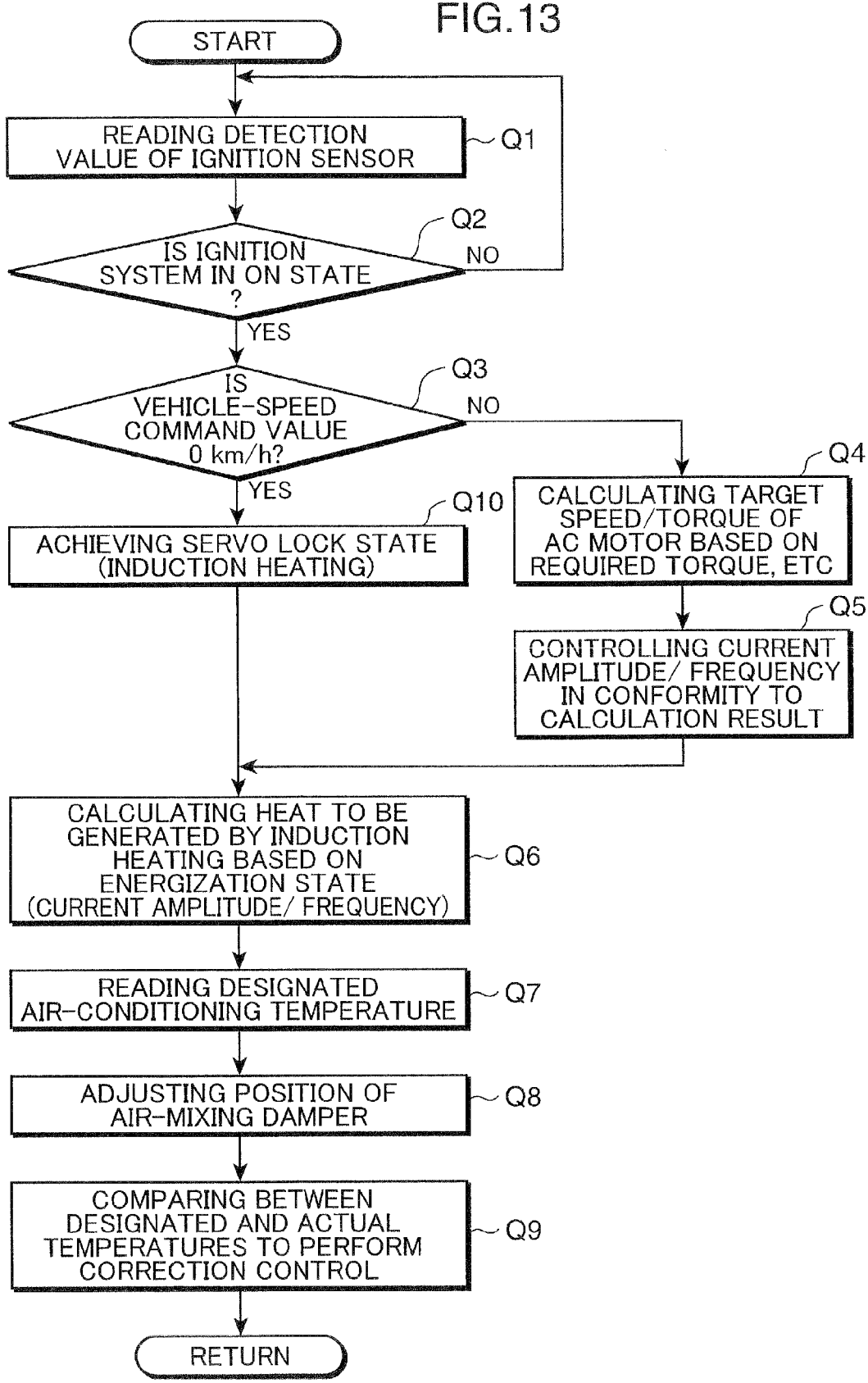
FIG. 13 is a flowchart showing one example of an induction heating control process in the induction heating system according to the first embodiment.

FIG. 13 is a flowchart showing one example of a control process of inductively heating the heater core HC using the induction heating coil C. Based on this flowchart, the control process will be described below. In the following description, Q means "step". In Q1, a detection value of the ignition sensor S8 is read. Then, in Q2, based on the read detection value, it is determined whether the ignition system is in the ON state. If the determination in Q2 is NO, the routine returned to Q1.

If the determination in Q2 is YES, it is determined whether a vehicle-speed command value is zero. Specifically, in Q3, it is determined whether the vehicle VC is in a stopped state. For example, the determination "YES" in Q3 is made when an accelerator pedal angle is zero, and a vehicle speed detected by a vehicle speed sensor (not shown) is zero. If the determination in Q3 is NO, it indicates that the vehicle VC is in a running state and it is necessary to drive the AC motor 1. Thus, the controller CU performs a control operation of performing energization to the AC motor 1 in the given order as shown in FIGS. 4 to 9. Specifically, in Q4, a target rotational speed and a target output torque of the AC motor 1 are calculated based on a driving state of the vehicle VC (e.g., an actual vehicle speed, and a required torque corresponding to an actual accelerator pedal angle). Then, in Q5, the AC motor 1 is rotationally driven by an alternating current having an amplitude value and a frequency satisfying a calculation result in Q4.

After Q5, in Q6, an amount of heat to be generated by induction heating using the induction heating coil C is calculated based on an energization state of the electromagnetic coils U, V, W of the AC motor 1 (the amplitude value and frequency of the alternating current controlled in Q5). Then, in Q7, a designated temperature manually set using the switch S7 is read. Then, in Q8, the position of the air-mixing damper 30 is controllably adjusted based on the read designated temperature. Then, in Q9, the position of the air-mixing damper 30 is corrected based on a difference between the designated temperature and an actual vehicle-interior temperature detected by the sensor S3.

If the determination in Q3 is YES, it indicates that the AC motor 1 should be stopped without rotation. Thus, in Q10, the AC motor 1 is placed in the servo lock state so as to prevent the AC motor 1 from being rotationally driven (e.g., one of the energization modes in FIGS. 10 to 12 is selected). In the servo lock state, the induction heating coil C is also energized to cause the heater core HC to be inductively heated. After Q10, the processings in Q6 to Q9 are performed.

As described above, the induction heating system according to the first embodiment is designed to inductively heat the heater core HC as a target component mounted to the vehicle VC. The induction heating system comprises the polyphase-type AC motor 1 adapted to drive the vehicle VC, the high-voltage battery 10 as an electrical storage device which stores an electric power to be supplied to the AC motor 1, the DC-AC converter 11 adapted to convert a direct current from the high-voltage battery 10 into an alternating current and supply the alternating current to the AC motor 1, and the induction heating coil C adapted to receive a supply of the alternating current from the DC-AC converter 11, to inductively heat the heater core HC.

In the induction heating system according to the first embodiment, the DC-AC converter 11 inserted between the high-voltage battery 10 and the AC motor 1 can be effectively used as a converter for induction heating, to eliminate the need for providing an additional converter exclusively for induction heating. Obviously, the induction heating is advantageous in improving energy efficiency and in heating the heater core HC as a target component, in an overall area thereof.

In the induction heating system according to the first embodiment, the induction heating coil C is inserted in the line 70 extending from the neutral point α of the AC motor 1. This makes it possible to perform induction heating during driving of the AC motor 1, by use of only the single induction heating coil C without providing a plurality of induction heating coils corresponding to respective phases of the polyphase-type AC motor 1.

Further, the induction heating system according to the first embodiment is configured to inductively heat the heater core HC during stopping of the vehicle VC, under the condition that the induction heating coil C is energized while setting the AC motor 1 in the servo lock state. This makes it possible to perform induction heating during stopping of the vehicle VC, without rotating the AC motor 1.

The induction heating system according to the first embodiment is configured to inductively heat the heater core HC in the air-conditioning system, by use of the induction heating coil C. This makes it possible to efficiently warm the vehicle-interior space by means of induction heating. In addition, the induction heating coil C can be arranged without interfering with an internal passage of the heater core HC where air-conditioning air passes. This is advantageous in reducing a resistance to flow of the air-conditioning air.

Second Embodiment

Figure 14:
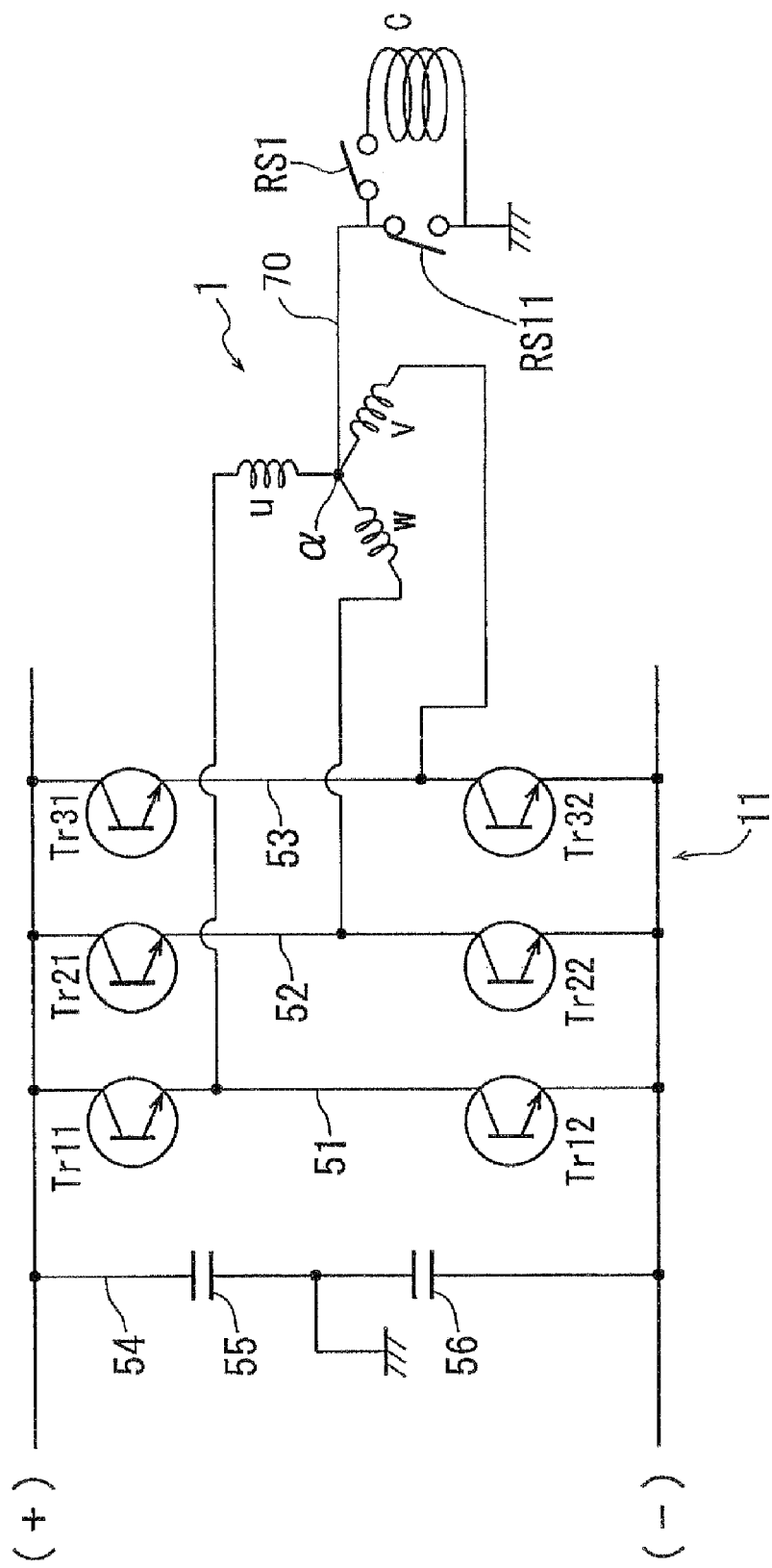
FIG. 14 is an explanatory diagram showing a connection between the AC motor, the induction heating coil and the DC-AC converter, in an induction heating system according to a second embodiment of the present invention.
Figure 15:
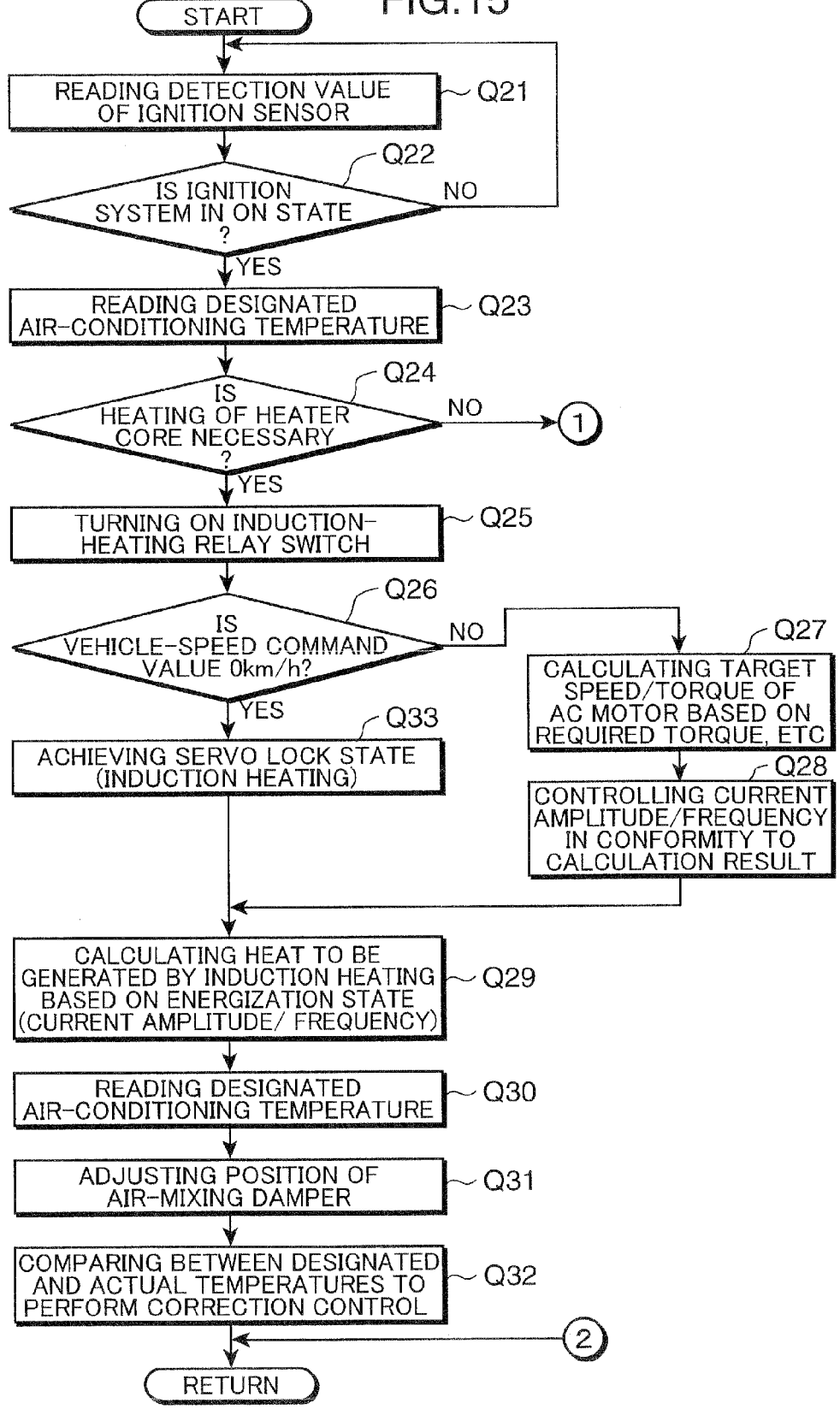
FIG. 15 is a flowchart showing one example of an induction heating control process in the induction heating system according to the second embodiment.
Figure 16:
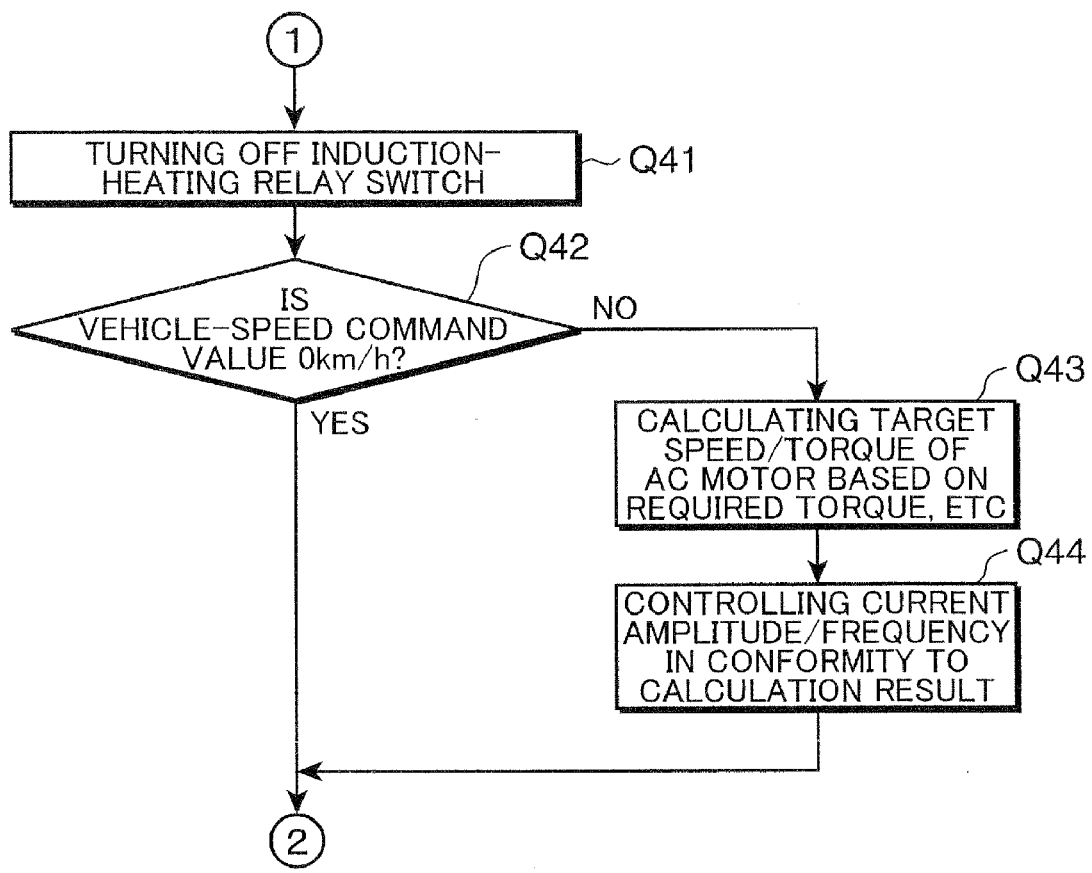
FIG. 16 is a flowchart showing a part of the induction heating control process in FIG. 15.

FIGS. 14 to 16 show an induction heating system according to a second embodiment of the present invention. The second embodiment is different from the first embodiment in that, in order to arbitrarily cut off energization to the induction heating coil C, the induction heating coil C is connected to the neutral point α via a relay switch RS1, and the neutral point α is connected to ground via a relay switch RS11 in such a manner as to bypass the relay switch RS1 and the induction heating coil C. Thus, when the relay switch RS1 is turned off, energization to the induction heating coil C is cut off to preclude performing induction heating. That is, when it is unnecessary to inductively heat the heater core HC, energization to the induction heating coil C can be cut off to suppress unwanted power consumption due to the induction heating coil C. In the second embodiment, the relay switch RS11 is adapted to be turned on when the ignition system is in the ON state, and turned off when the ignition system is in the OFF state. However, the relay switch RS11 is not essential to the second embodiment, but may be omitted.

FIGS. 15 and 16 are a flowchart showing one example of a control process for induction heating using the circuit in FIG. 14. Based on this flowchart, the control process will be described below. The flowchart in FIGS. 15 and 16 includes a common processing to that of the flowchart in FIG. 13. Thus, the following description will be made mainly about a difference from the flowchart in FIG. 13. Further, the following description will be made on the assumption that the relay switch RS11 is continuously turned on when the ignition system is in the ON state, and turned off when the ignition system is in the OFF state.

Firstly, processings in Q21 and Q22 corresponding to Q1 and Q2 in FIG. 13 are performed. If the determination in Q22 is YES, the designated temperature manually set using the switch S7 is read in Q23. Then, in Q24, it is determined whether it is necessary to inductively heat the heater core HC. For example, in Q24, when the engine coolant temperature is sufficiently greater than the designated temperature or when the vehicle-interior temperature is equal to or greater than the designated temperature, the induction heating is determined to be unnecessary (i.e., NO), whereas, under any other conditions, the induction heating is determined to be necessary (i.e., YES). If the determination in Q24 is YES, the induction-heating relay switch RS1 is turned on in Q25. After Q25, processings in Q26 and subsequent steps will be performed, wherein Q26 to Q32 are identical to Q3 to Q9 in FIG. 13, and Q33 is identical to Q10 in FIG. 13.

If the determination in Q24 is NO, the induction-heating relay switch RS1 is turned off in Q41 in FIG. 16. Subsequently, processings in Q42 to Q44 will be performed, wherein Q42 to Q44 are identical to Q3 to Q5 in FIG. 13 (also identical to Q26 to Q28 in FIG. 15). After Q42 to Q44, the routine returns to Q21 in FIG. 15.

As described above, the induction heating system according to the second embodiment includes the relay switch RS1 as switch means operable to selectively cut off energization to the induction heating coil C. This makes it possible to cut off energization to the induction heating coil C when induction heating is unnecessary, so as to effectively reduce power consumption.

Third Embodiment

Figure 17:
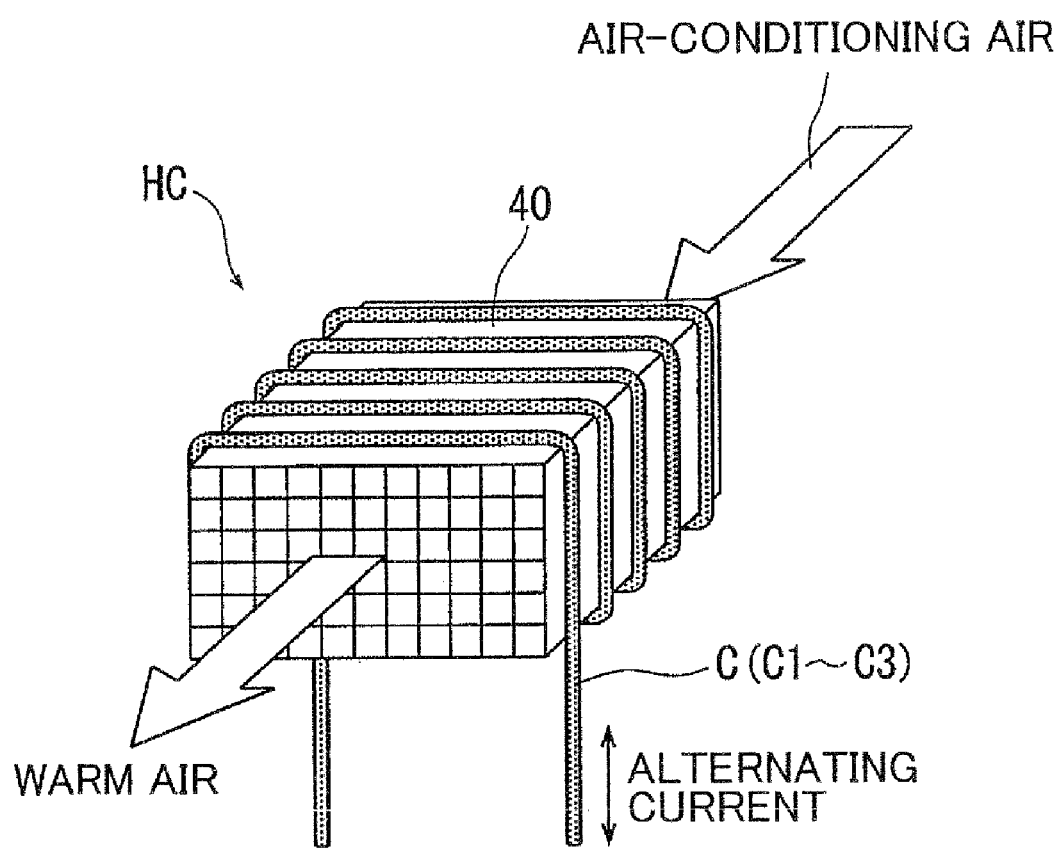
FIG. 17 is a fragmentary perspective view showing a heater core which is to be inductively heated by an induction heating system according to a third embodiment of the present invention.

FIGS. 17 to 26 show an induction heating system according to a third embodiment of the present invention, which is employed in the aforementioned vehicle VC as a motor-driven vehicle. As shown in FIGS. 17 to 26, the induction heating system according to the third embodiment comprises three induction heating coils C1, C2, C3 corresponding to respective phases of a three-phase AC motor 1. In FIG. 17, only a representative one of the three induction heating coils C1 to C3 is illustrated as an induction heating coil C. The three induction heating coils C1 to C3 may be appropriately arranged on a casing 40 of a heater core HC as a target component, in any suitable manner. For example, the induction heating coils C1 to C3 may be arranged in series along a longitudinal direction of the casing 40. Further, instead of winding the induction heating coils C1 to C3 around an outer peripheral surface of the casing 40, the induction heating coils C1 to C3 may be arranged along only a bottom of the casing 40 to cause the casing 40 to be inductively heated (an induction heating effect can be obtained by arranging the casing 40 in an effectively reachable range of magnetic field lines generated from each of the induction heating coils C1 to C3).

Figure 18:
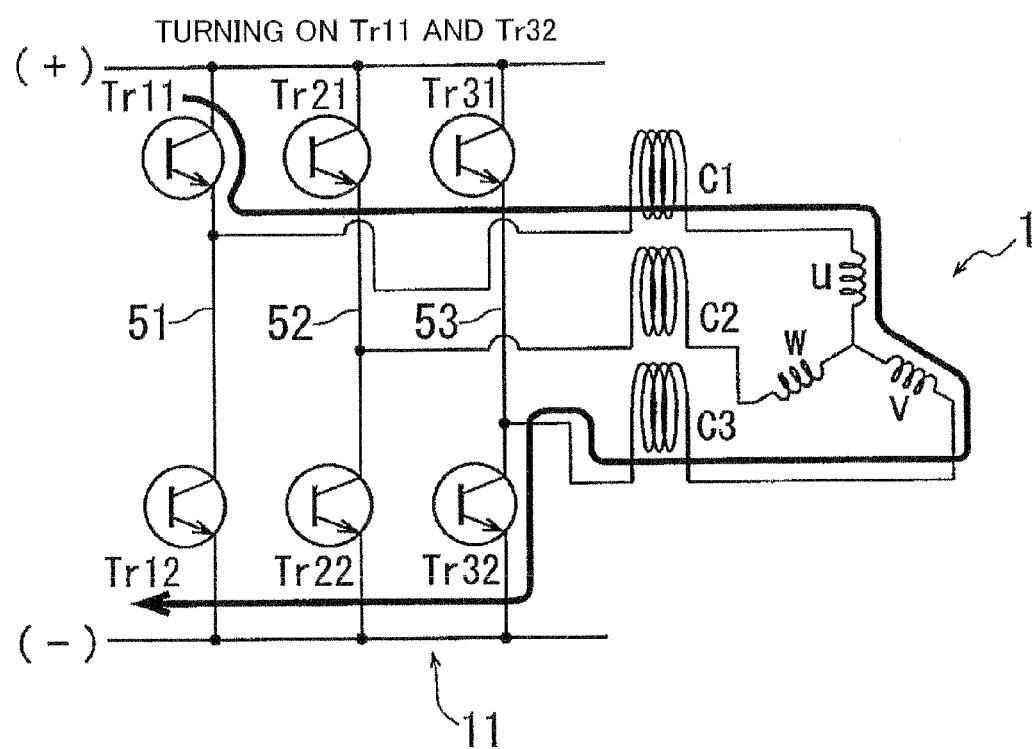
FIG. 18 is an explanatory diagram showing a connection between the AC motor, three induction heating coils and the DC-AC converter, and one example of an energization mode for rotationally driving the AC motor, in the induction heating system according to the third embodiment.

FIG. 18 shows one example of a connection between the electromagnetic coils U, V, W of the three-phase AC motor 1, the three induction heating coils C1 to C3, and the DC-AC converter 11. As with the first and second embodiments, The DC-AC converter 11 has three lines 51, 52, 53 connected in parallel to a positive (+) terminal and a negative (−) terminal of the high-voltage battery 10. An input-side switching element Tr11 and an output-side switching element Tr12 are inserted in series in the line 51. An input-side switching element Tr21 and an output-side switching element Tr22 are inserted in series in the line 52. An input-side switching element Tr31 and an output-side switching element Tr32 are inserted in series in the line 53.

The induction heating coil C1 has one end connected to the electromagnetic coil U, and the other end connected to the line 51 at a position between the switching elements Tr11, Tr12. The induction heating coil C2 has one end connected to the electromagnetic coil W, and the other end connected to the line 52 at a position between the switching elements Tr21, Tr22. The induction heating coil C3 has one end connected to the electromagnetic coil V, and the other end connected to the line 53 at a position between the switching elements Tr31, Tr32.

Figure 19:
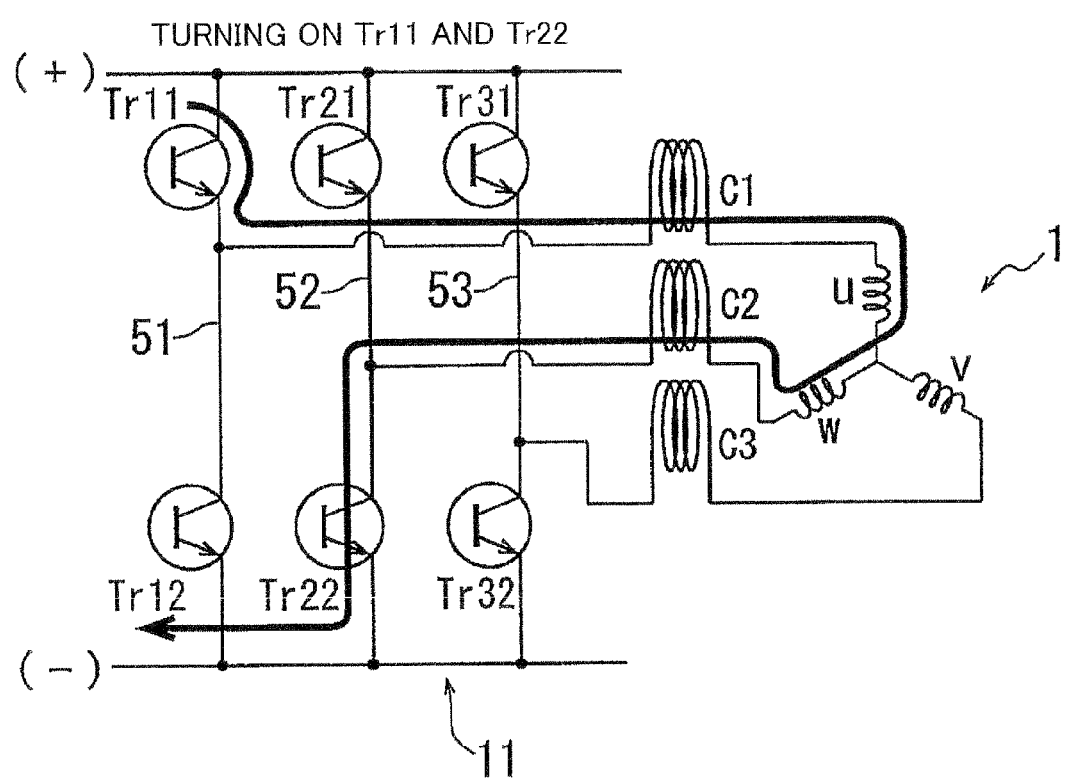
FIG. 19 is an explanatory diagram showing another example of the energization mode for rotationally driving the AC motor, in the induction heating system according to the third embodiment.
Figure 20:
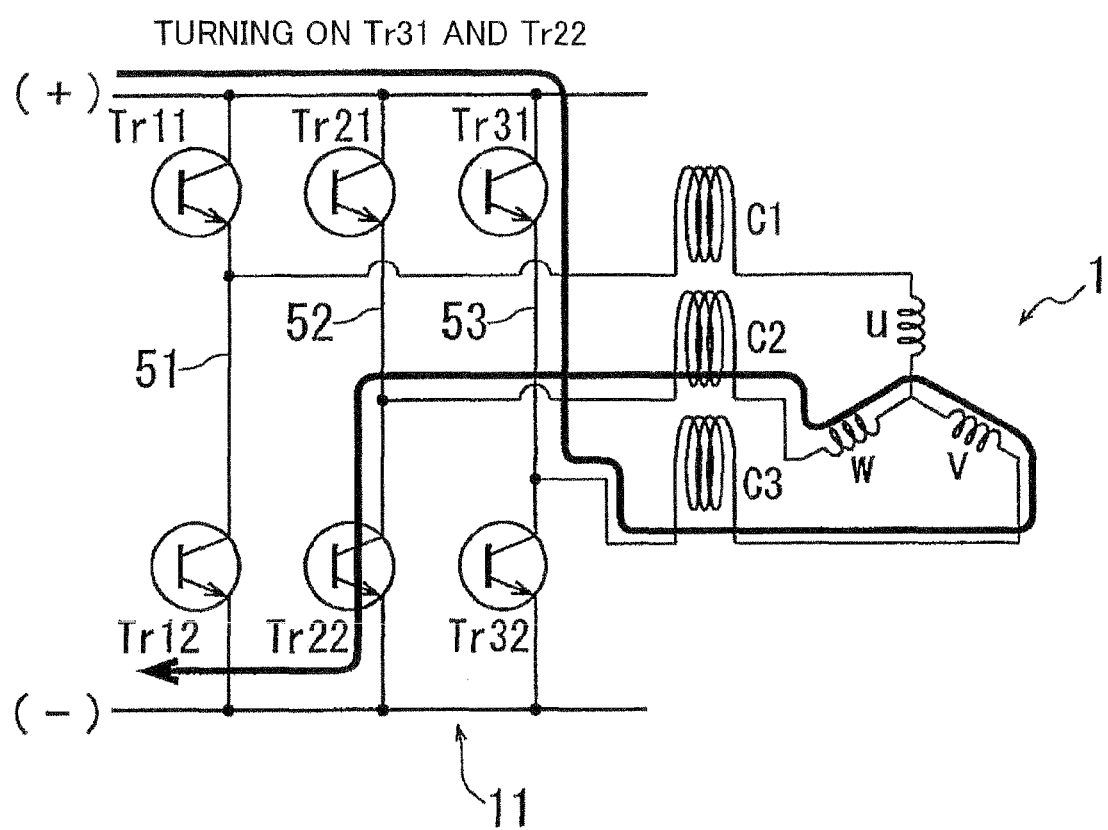
FIG. 20 is an explanatory diagram showing another example of the energization mode for rotationally driving the AC motor, in the induction heating system according to the third embodiment.
Figure 21:
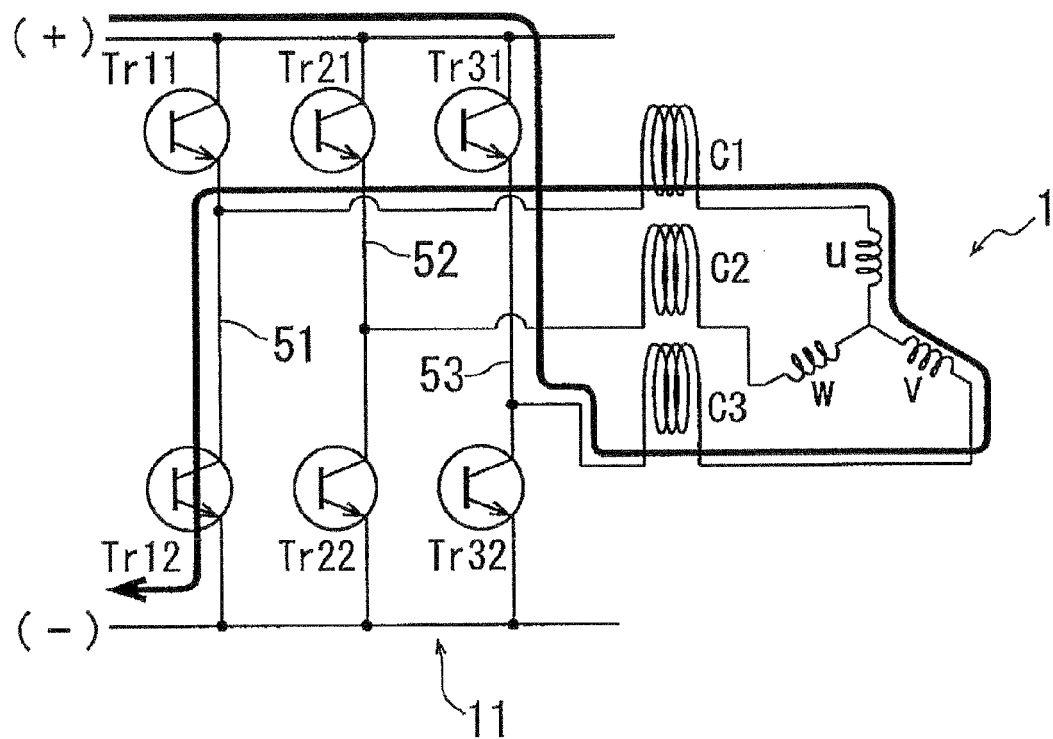
FIG. 21 is an explanatory diagram showing another example of the energization mode for rotationally driving the AC motor, in the induction heating system according to the third embodiment.
Figure 22:
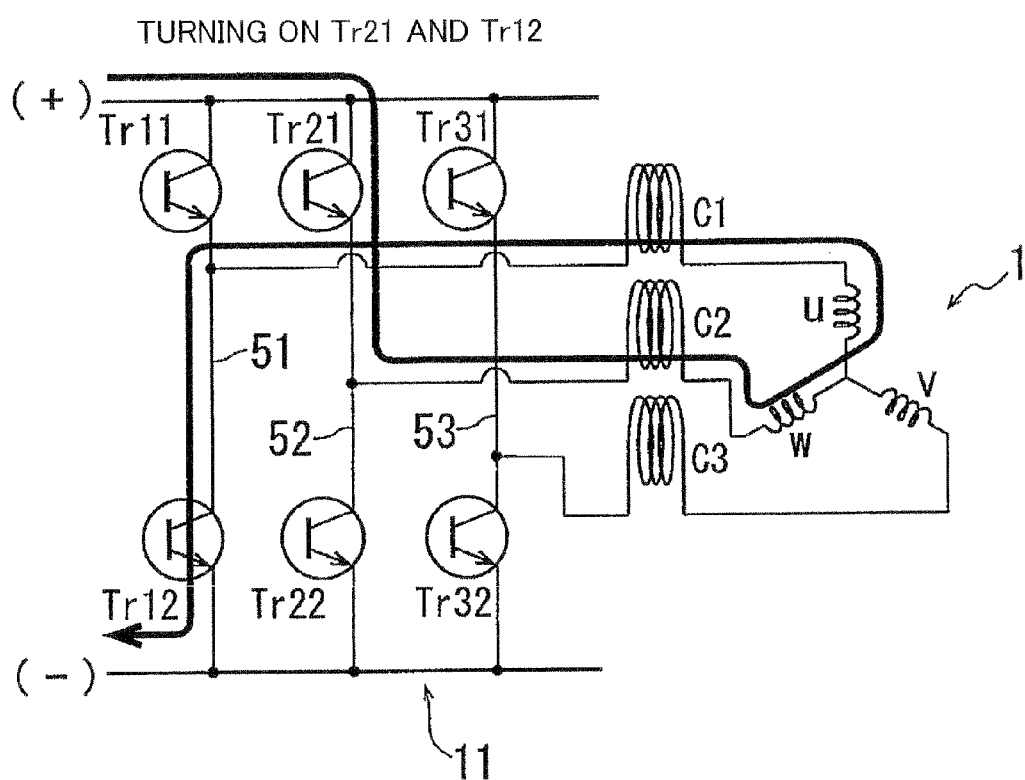
FIG. 22 is an explanatory diagram showing another example of the energization mode for rotationally driving the AC motor, in the induction heating system according to the third embodiment.
Figure 23:
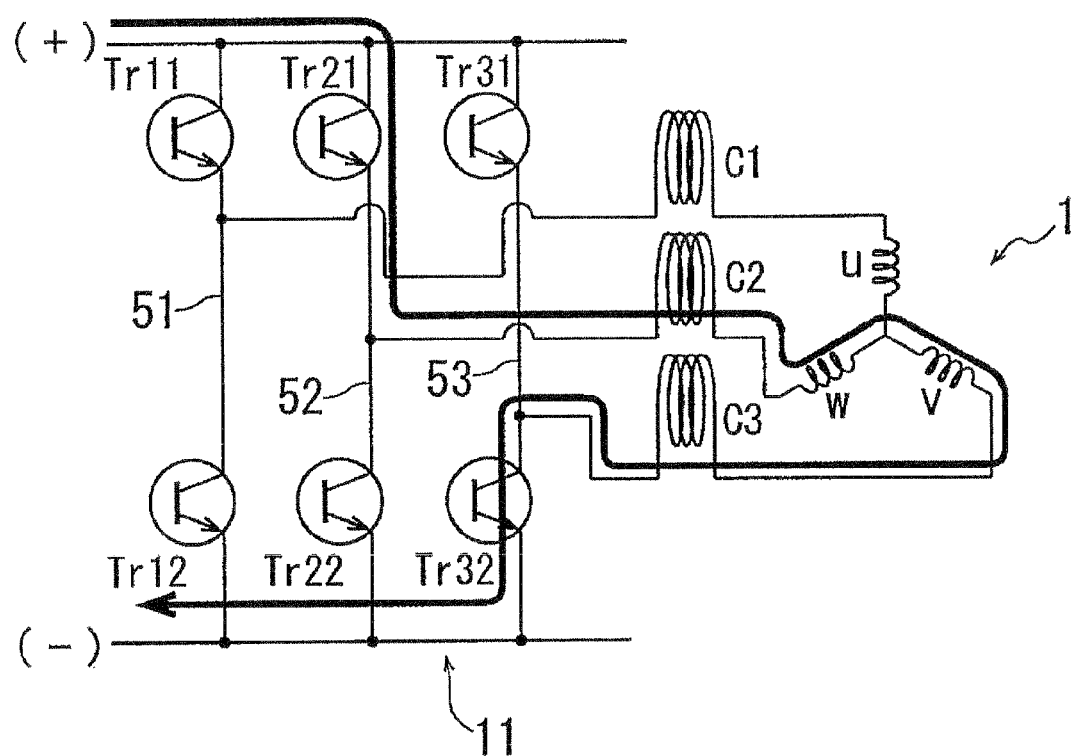
FIG. 23 is an explanatory diagram showing another example of the energization mode for rotationally driving the AC motor, in the induction heating system according to the third embodiment.

In an operation of rotating the AC motor 1 in a normal direction (i.e., in a direction for driving the vehicle forwardly), two of the six switching elements Tr11 to Tr32 are sequentially turned on, for example, in respective modes illustrated in FIGS. 18, 19, 20, 21, 22 and 23 in this order, and, after the mode in FIG. 23, re-turned on in order from the mode in FIG. 18 (in an operation of rotating the AC motor 1 in a reverse direction, two of the six switching elements Tr11 to Tr32 may be turned on in the converse order). Specifically, FIG. 18 shows a mode where the two switching elements Tr11, Tr32 are turned on. In this mode, a current flows through the induction heating coil C1, the electromagnetic coils U, V and the induction heating coil C3. FIG. 19 shows a mode where the two switching elements Tr11, Tr22 are turned on. In this mode, a current flows through the induction heating coil C1, the electromagnetic coils U, W and the induction heating coil C2. FIG. 20 shows a mode where the two switching elements Tr31, Tr22 are turned on. In this mode, a current flows through the induction heating coil C3, the electromagnetic coils V, W and the induction heating coil C2. FIG. 21 shows a mode where the two switching elements Tr31, Tr12 are turned on. In this mode, a current flows through the induction heating coil C3, the electromagnetic coils V, U and the induction heating coil C1. FIG. 22 shows a mode where the two switching elements Tr21, Tr12 are turned on. In this mode, a current flows through the induction heating coil C2, the electromagnetic coils W, U and the induction heating coil C1. FIG. 23 shows a mode where the two switching elements Tr21, Tr32 are turned on. In this mode, a current flows through the induction heating coil C2, the electromagnetic coils W, V and the induction heating coil C3. In this way, two of the electromagnetic coils U, V, W are sequentially energized to allow a rotor (not shown) of the AC motor 1 to be rotationally driven. During the rotational driving of the AC motor 1, two of the induction heating coils C1 to C3 are sequentially energized, so that the heater core HC is inductively heated.

Figure 24:
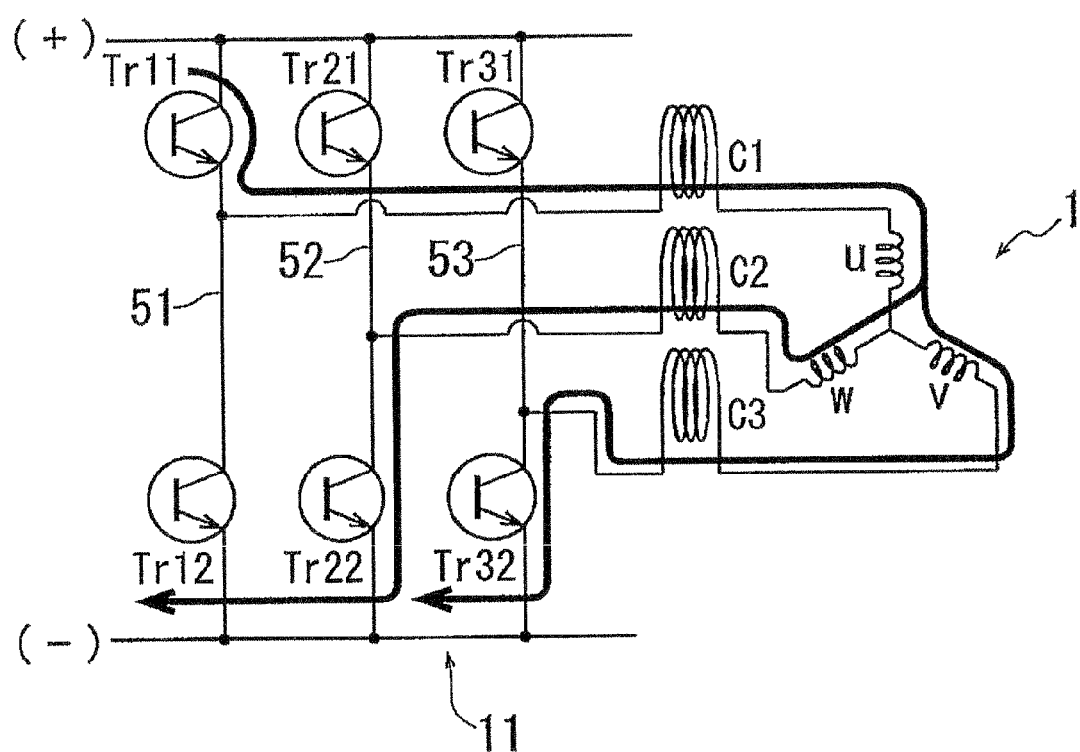
FIG. 24 is an explanatory diagram showing one example of an energization mode for setting the AC motor in a servo lock state, in the induction heating system according to the third embodiment.
Figure 25:
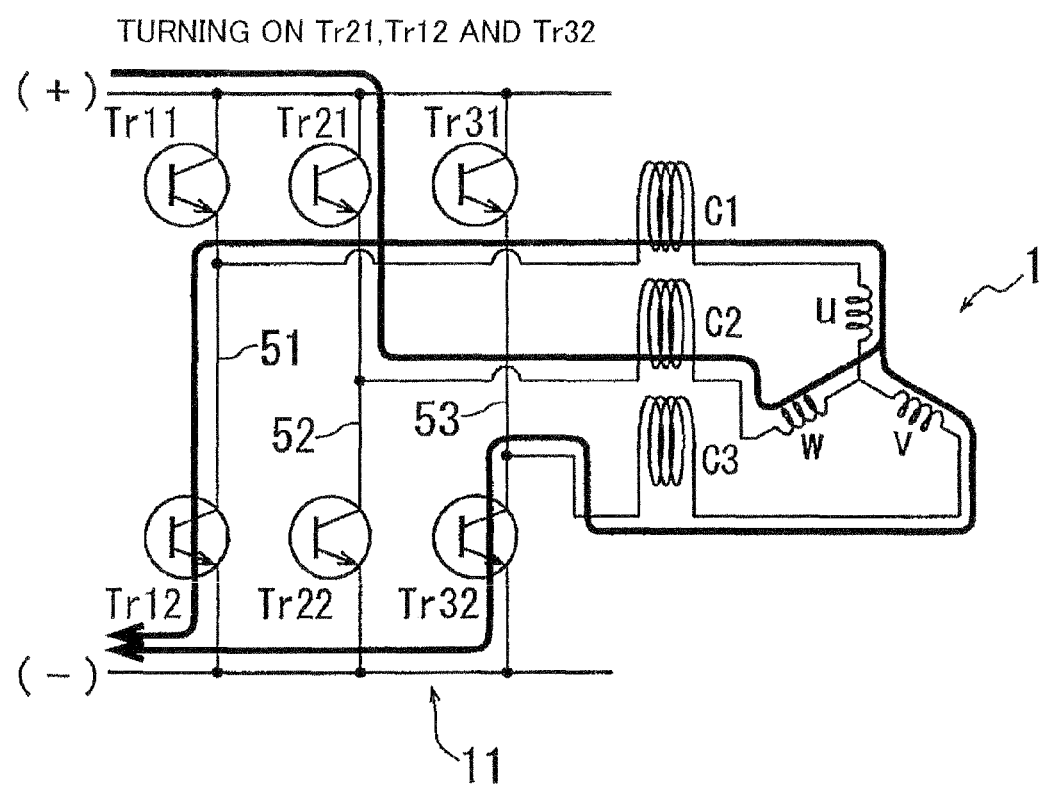
FIG. 25 is an explanatory diagram showing another example of the energization mode for setting the AC motor in the servo lock state, in the induction heating system according to the third embodiment.
Figure 26:
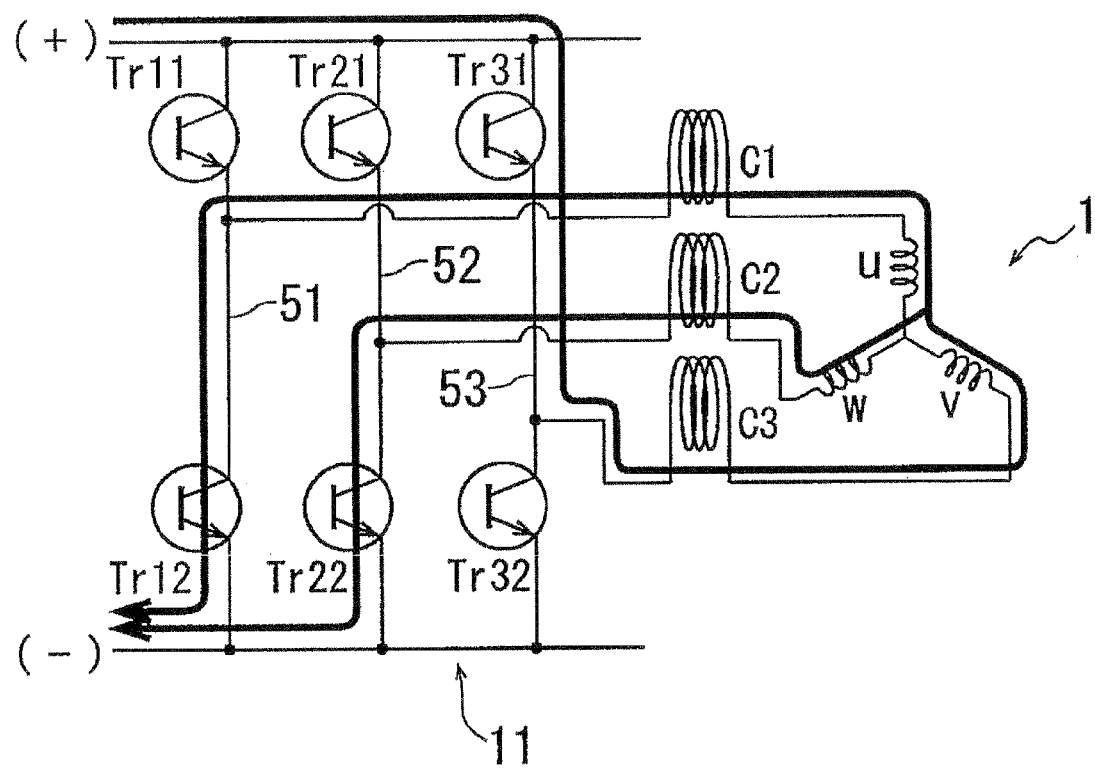
FIG. 26 is an explanatory diagram showing another example of the energization mode for setting the AC motor in the servo lock state, in the induction heating system according to the third embodiment.

FIGS. 24 to 26 show three modes for energizing the induction heating coils C1 to C3 while setting the AC motor 1 in a servo lock state to stop the rotational driving thereof. In the third embodiment, the servo lock state is achieved by energizing all the electromagnetic coils U, V, W. Specifically, FIG. 24 shows a mode where the three switching elements Tr11, Tr22, Tr32 are turned on. FIG. 25 shows a mode where the three switching elements Tr21, Tr12, Tr32 are turned on. FIG. 26 shows a mode where the three switching elements Tr31, Tr12, Tr22 are turned on. Instead of the modes illustrated in FIGS. 24 to 26, the servo lock state may be achieved by appropriately switching between the energization modes illustrated in FIGS. 18 to 23 depending on a position of the rotor, in such a manner as to prevent the rotor of the AC motor 1 from being rotationally driven.

In an operation of inductively heating the heater core HC using the induction heating system according to the third embodiment, the same control process as that described in the first embodiment with reference to the flowchart in FIG. 13 is employed. Thus, its description will be omitted.

In the induction heating system according to the third embodiment, the DC-AC converter 11 can be effectively used as a converter for induction heating, to efficiently heat the heater core HC as a target component, in the same manner as that in the first embodiment.

Fourth Embodiment

Figure 27:
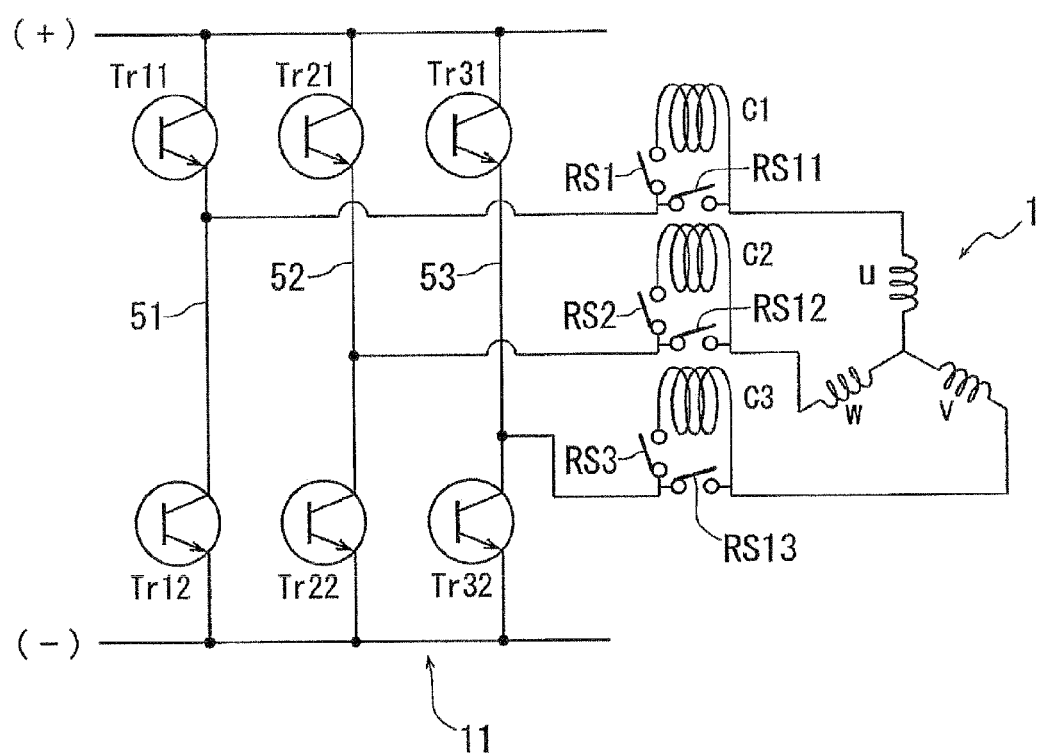
FIG. 27 is an explanatory diagram showing a connection between the AC motor, the induction heating coils and the DC-AC converter, in an induction heating system according to a fourth embodiment of the present invention.

FIG. 27 shows an induction heating system according to a fourth embodiment of the present invention. The fourth embodiment is different from the third embodiment in that each of the induction heating coils C1 to C3 is connected to a corresponding one of the lines 51 to 53, for example, via a respective one of three relay switches RS1, RS2, RS3, so as to arbitrarily cut off energization to each of the induction heating coils C1 to C3, and three relay switches RS11, RS12, RS13 are inserted between corresponding ones of the electromagnetic coils U, V, W and the lines 51, 52, 53, so as to arbitrarily cut off energization to respective ones of the electromagnetic coils U, V, W of the AC motor 1. Thus, when all the relay switch RS1 to RS3 are turned off, energization to the induction heating coils C1 to C3 is cut off to preclude performing induction heating. Further, when all the relay switch RS1 to RS3 are turned off while maintaining each of the relay switches RS11, RS12, RS13 in its ON state, the AC motor 1 can be rotationally driven while stopping induction heating. That is, when it is unnecessary to inductively heat the heater core HC, energization to the induction heating coils C1 to C3 can be cut off to suppress unwanted power consumption due to the induction heating coils C1 to C3.

In an operation of inductively heating the heater core HC using the induction heating system according to the fourth embodiment, the same control process as that described in the second embodiment with reference to the flowchart in FIGS. 15 and 16 is employed. Thus, its description will be omitted.

In the induction heating system according to the fourth embodiment, when it is unnecessary to perform induction heating, energization to the induction heating coils C1 to C3 can be cut off using the relay switches RS1 to RS3 to effectively reduce power consumption, in the same manner as that in the second embodiment.

Fifth Embodiment

FIGS. 28 to 42 show an induction heating system according to a fifth embodiment of the present invention, which is employed in the aforementioned vehicle VC as a motor-driven vehicle. As shown in FIGS. 28 to 42, the induction heating system according to the fifth embodiment comprises three induction heating coils C1, C2, C3 corresponding to respective phases of a three-phase AC motor 1.

Figure 28:
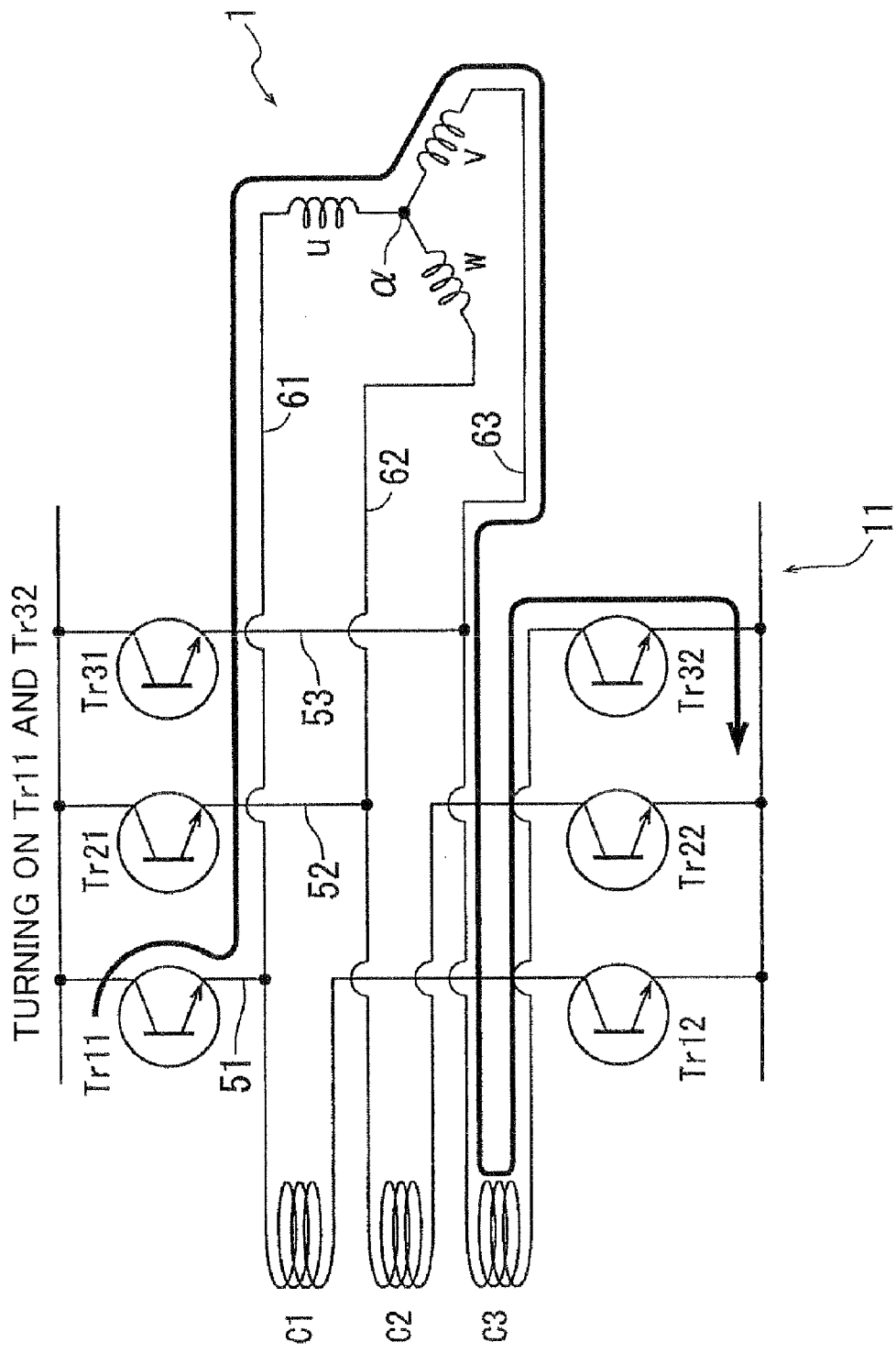
FIG. 28 is an explanatory diagram showing a connection between the AC motor, the three induction heating coils and the DC-AC converter, and one example of an energization mode for rotationally driving the AC motor, in an induction heating system according to a fifth embodiment of the present invention.

FIG. 28 shows one example of a connection between the electromagnetic coils U, V, W of the three-phase AC motor 1, the three induction heating coils C1 to C3, and the DC-AC converter 11. As with the first to fourth embodiments, The DC-AC converter 11 has three lines 51, 52, 53 connected in parallel to a positive (+) terminal and a negative (−) terminal of the high-voltage battery 10. An input-side switching element Tr11 and an output-side switching element Tr12 are inserted in series in the line 51, and the induction heating coil C1 is inserted in the line 51 at a position between the switching elements Tr11, Tr12. An input-side switching element Tr21 and an output-side switching element Tr22 are inserted in series in the line 52, and the induction heating coil C2 is inserted in the line 52 at a position between the switching elements Tr21, Tr22. An input-side switching element Tr31 and an output-side switching element Tr32 are inserted in series in the line 53, and the induction heating coil C3 is inserted in the line 53 at a position between the switching elements Tr31, Tr32.

The electromagnetic coil U of the AC motor 1 has one end connected to a neutral point α of the AC motor 1, and the other end connected to the line 51 at a position between the switching element Tr11 and the induction heating coil C1 through a line 61. The electromagnetic coil W of the AC motor 1 has one end connected to the neutral point α, and the other end connected to the line 52 at a position between the switching element Tr21 and the induction heating coil C2 through a line 62. The electromagnetic coil V of the AC motor 1 has one end connected to the neutral point α, and the other end connected to the line 53 at a position between the switching element Tr31 and the induction heating coil C3 through a line 63.

Figure 29:
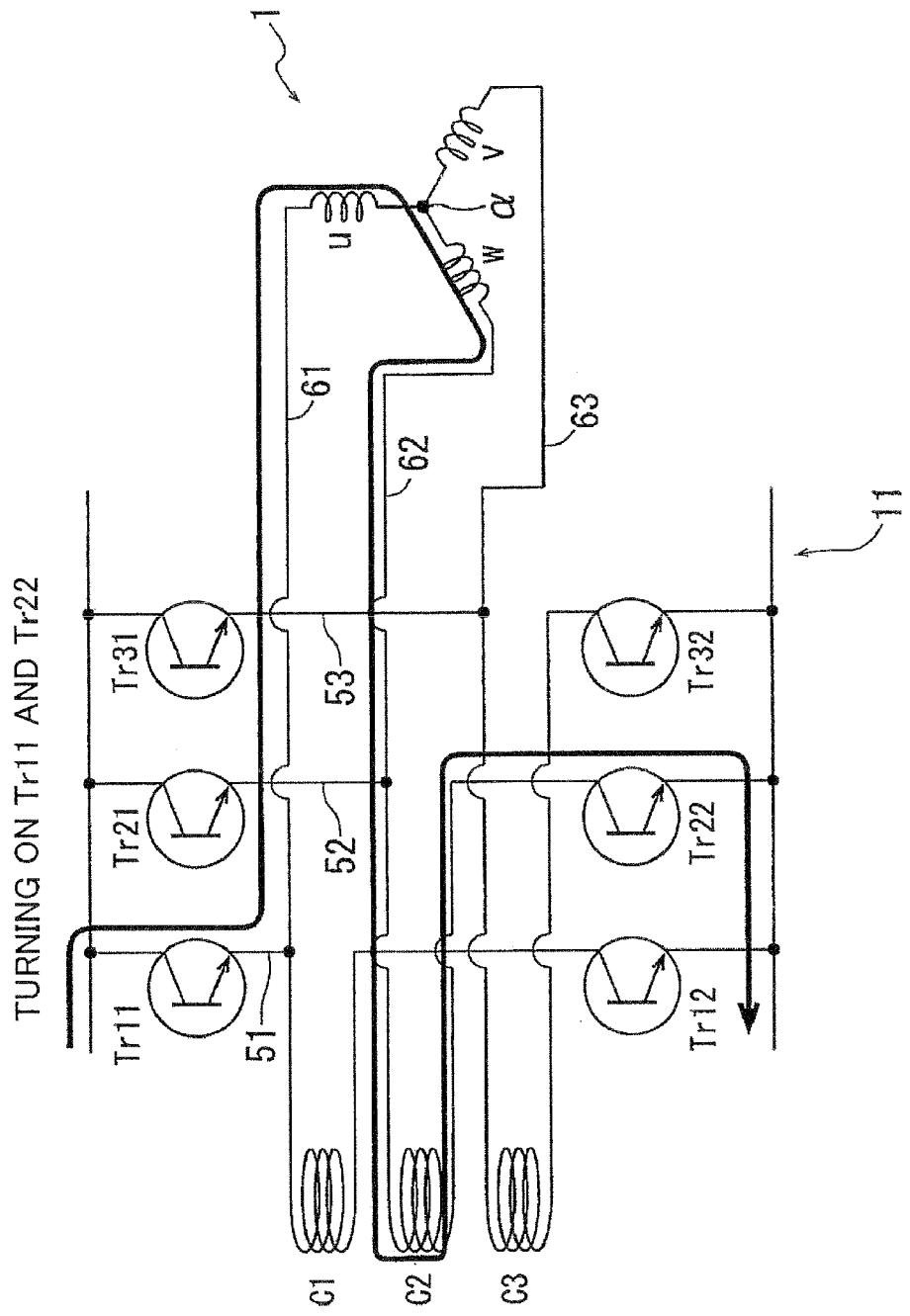
FIG. 29 is an explanatory diagram showing another example of the energization mode for rotationally driving the AC motor, in the induction heating system according to the fifth embodiment.
Figure 30:
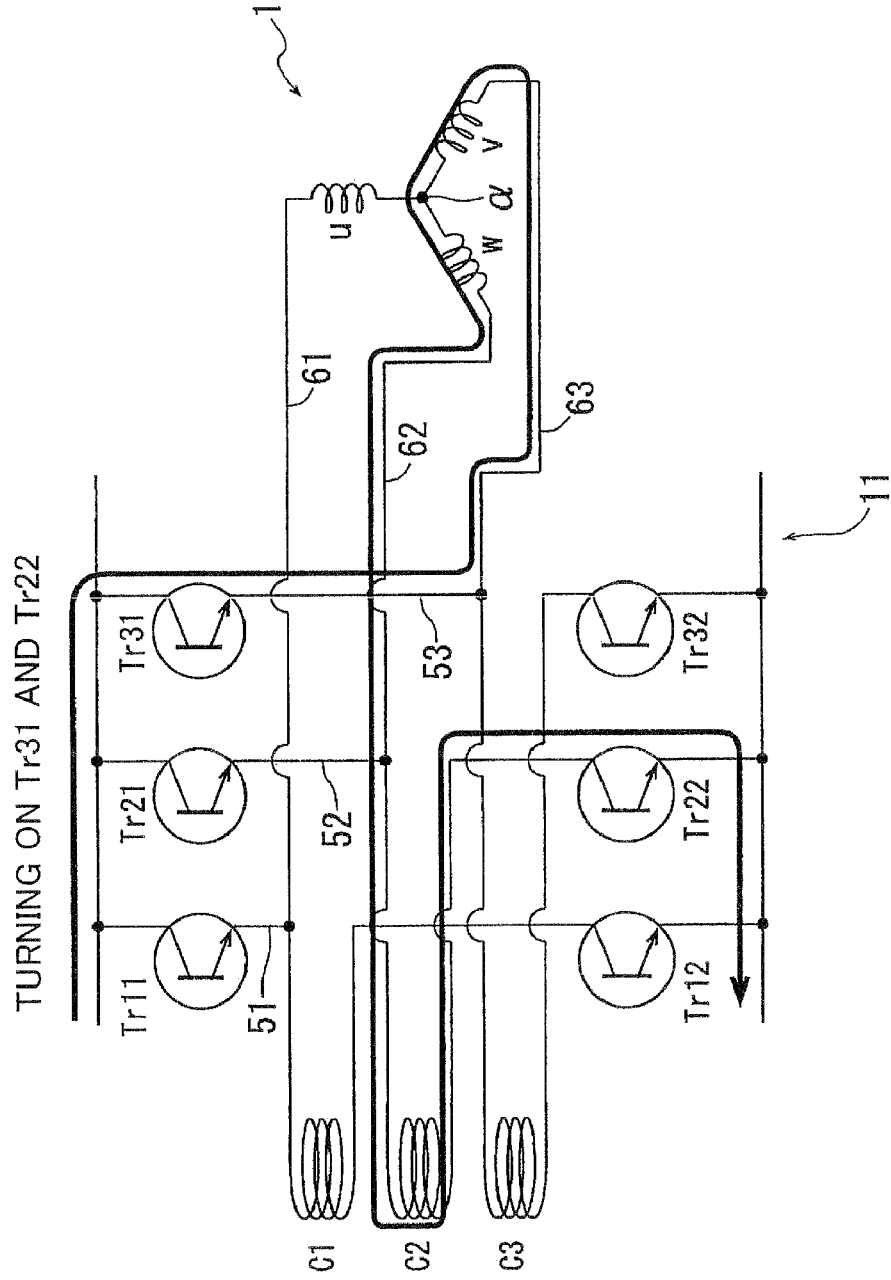
FIG. 30 is an explanatory diagram showing another example of the energization mode for rotationally driving the AC motor, in the induction heating system according to the fifth embodiment.
Figure 31:
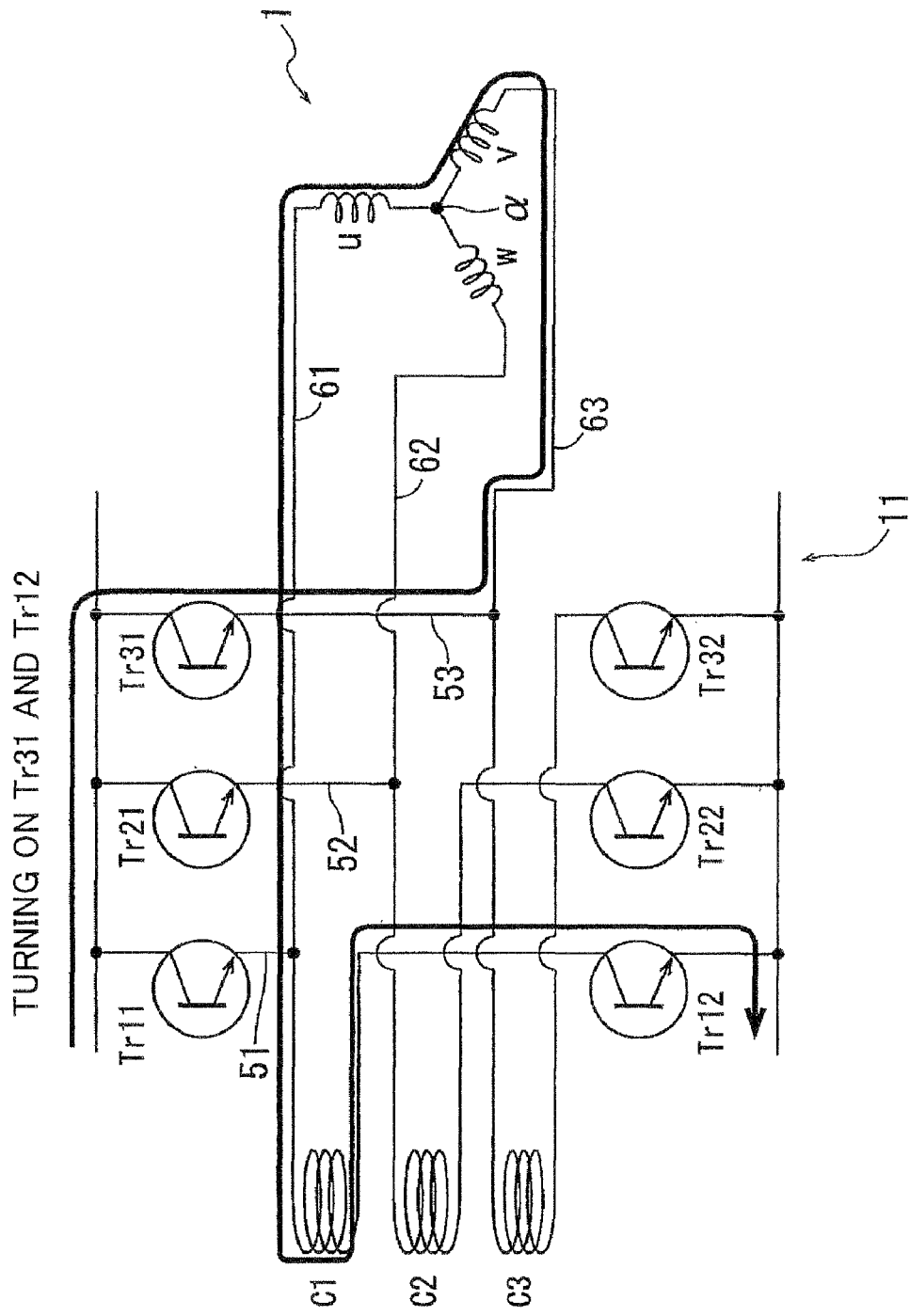
FIG. 31 is an explanatory diagram showing another example of the energization mode for rotationally driving the AC motor, in the induction heating system according to the fifth embodiment.
Figure 32:
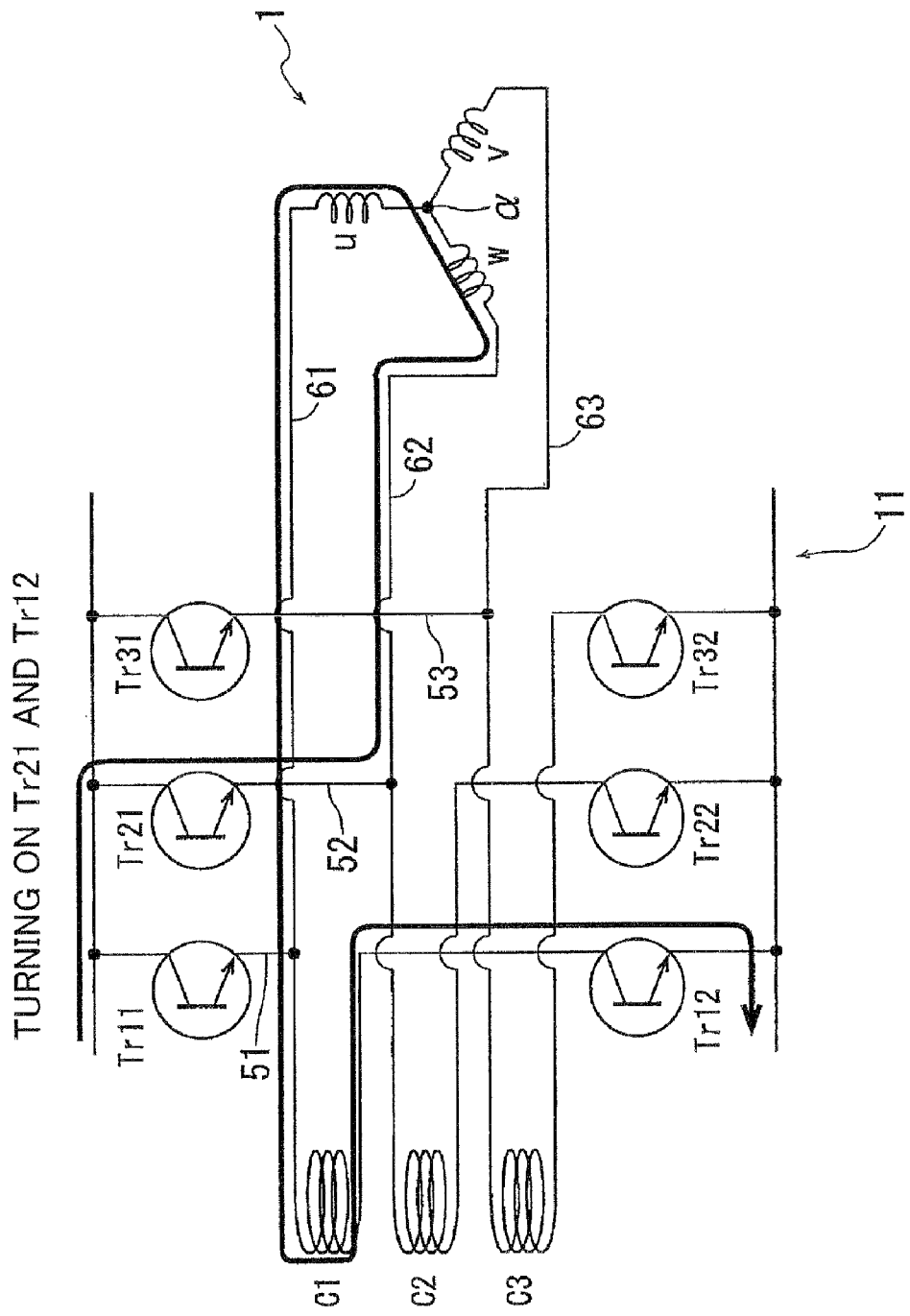
FIG. 32 is an explanatory diagram showing another example of the energization mode for rotationally driving the AC motor, in the induction heating system according to the fifth embodiment.
Figure 33:
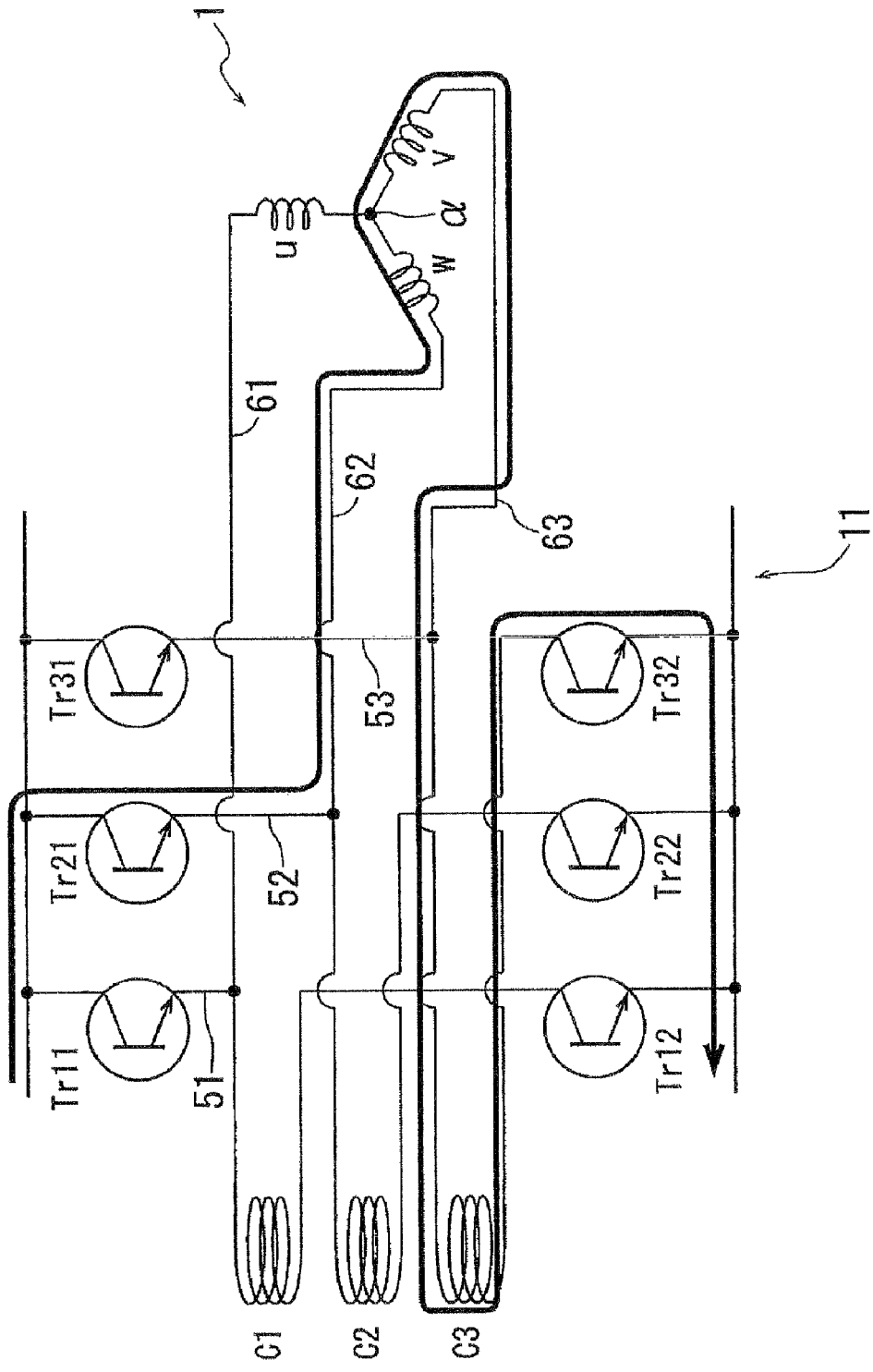
FIG. 33 is an explanatory diagram showing another example of the energization mode for rotationally driving the AC motor, in the induction heating system according to the fifth embodiment.

In an operation of rotating the AC motor 1 in a normal direction (i.e., in a direction for driving the vehicle forwardly), two of the six switching elements Tr11 to Tr32 are sequentially turned on, for example, in respective modes illustrated in FIGS. 28, 29, 30, 31, 32 and 33 in this order, and, after the mode in FIG. 33, re-turned on in order from the mode in FIG. 28 (in an operation of rotating the AC motor 1 in a reverse direction, two of the six switching elements Tr11 to Tr32 may be turned on in the converse order). Specifically, FIG. 28 shows a mode where the two switching elements Tr11, Tr32 are turned on. In this mode, a current flows through the electromagnetic coils U, V and the induction heating coil C3. FIG. 29 shows a mode where the two switching elements Tr11, Tr22 are turned on. In this mode, a current flows through the electromagnetic coils U, W and the induction heating coil C2. FIG. 30 shows a mode where the two switching elements Tr31, Tr22 are turned on. In this mode, a current flows through the electromagnetic coils V, W and the induction heating coil C2. FIG. 31 shows a mode where the two switching elements Tr31, Tr12 are turned on. In this mode, a current flows through the electromagnetic coils V, U and the induction heating coil C1. FIG. 32 shows a mode where the two switching elements Tr21, Tr12 are turned on. In this mode, a current flows through the electromagnetic coils W, U and the induction heating coil C1. FIG. 33 shows a mode where the two switching elements Tr21, Tr32 are turned on. In this mode, a current flows through the electromagnetic coils W, V and the induction heating coil C3.

Figure 41:
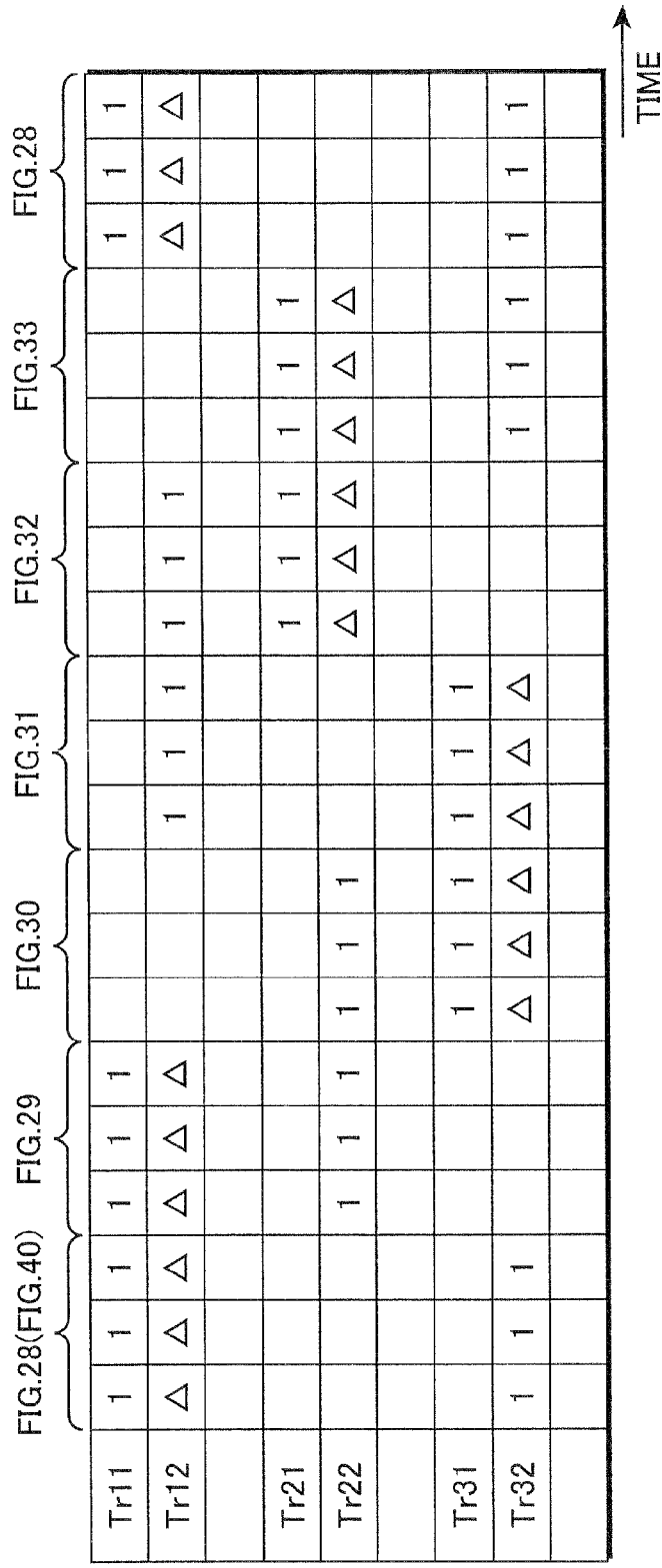
FIG. 41 is a table showing two of the switching elements to be turned on to drive the AC motor and one of the switching elements to be additionally turned on to energize the induction heating coil, in the induction heating system according to the fifth embodiment.

According to the on/off switching actions of the switching elements Tr11 to Tr32 as shown in FIGS. 28 to 33, two of the electromagnetic coils U, V, W are sequentially energized to allow a rotor (not shown) of the AC motor 1 to be rotationally driven. During the rotational driving of the AC motor 1 (during energization of two of the electromagnetic coils U, V, W), one of the three induction heating coils C1 to C3 is sequentially energized, so that a heater core HC as a target component is inductively heated. FIG. 41 shows a summary of the on/off switching actions in FIGS. 28 to 33, wherein the code "1" indicates that one of the switching elements is turned on to rotationally drive the AC motor 1. In this case, the on/off switching action of each of the switching elements Tr11 to Tr32 can be controlled based on a duty control or the like to change an amplitude value and/or a frequency of an alternating current so as to control a rotational speed and an output torque of the AC motor 1.

Figure 34:
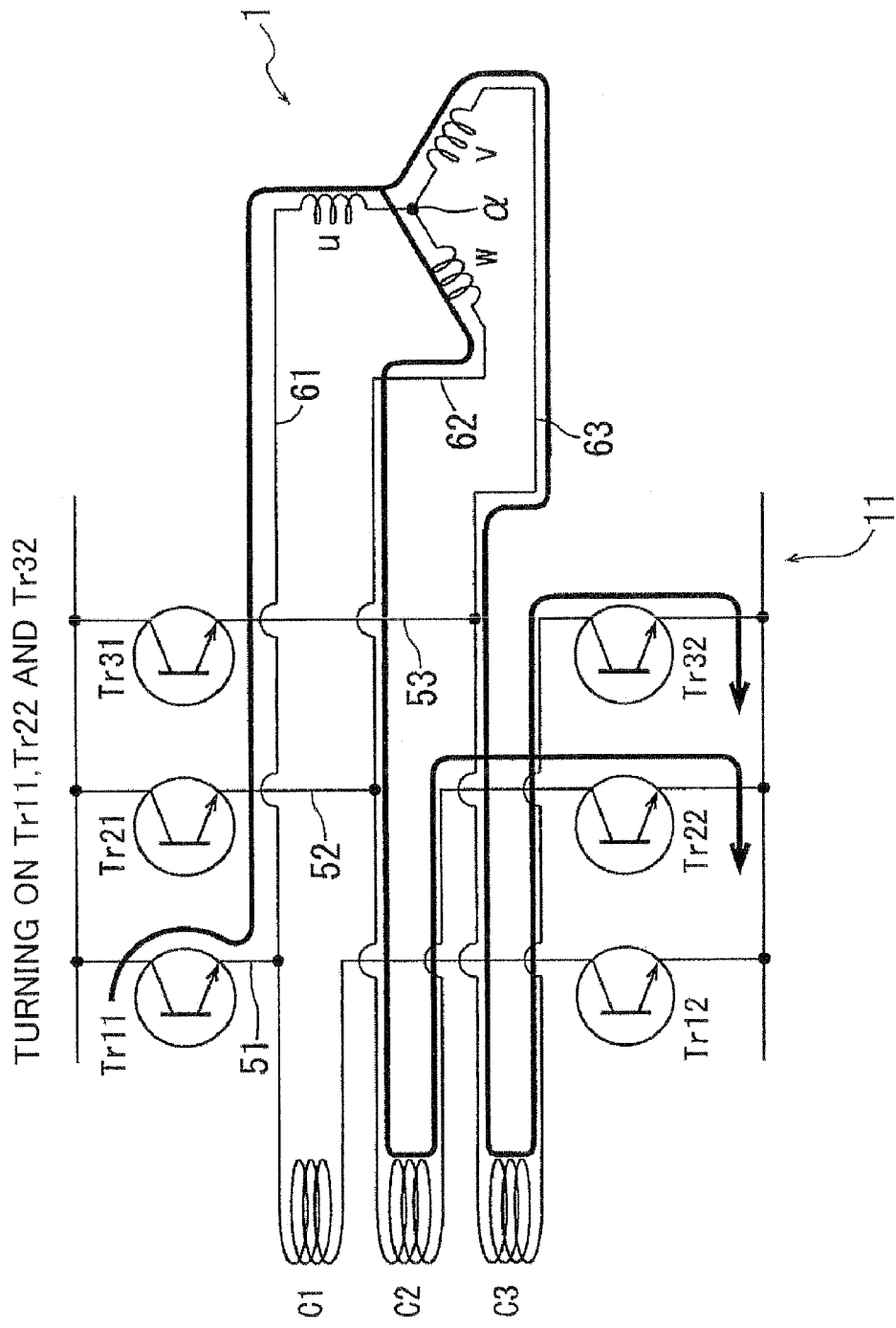
FIG. 34 is an explanatory diagram showing one example of an energization mode for setting the AC motor in a servo lock state, in the induction heating system according to the fifth embodiment.
Figure 35:
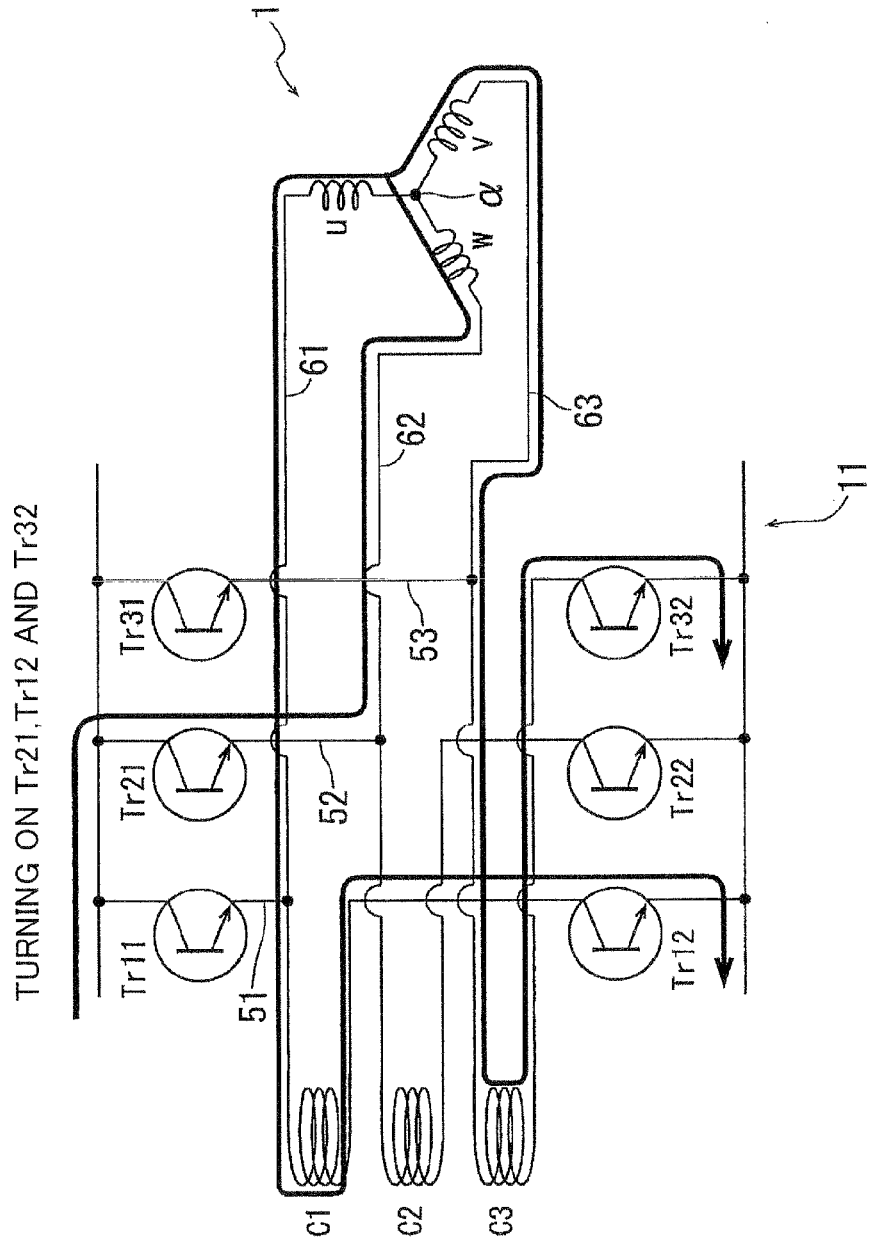
FIG. 35 is an explanatory diagram showing another example of the energization mode for setting the AC motor in the servo lock state, in the induction heating system according to the fifth embodiment.
Figure 36:
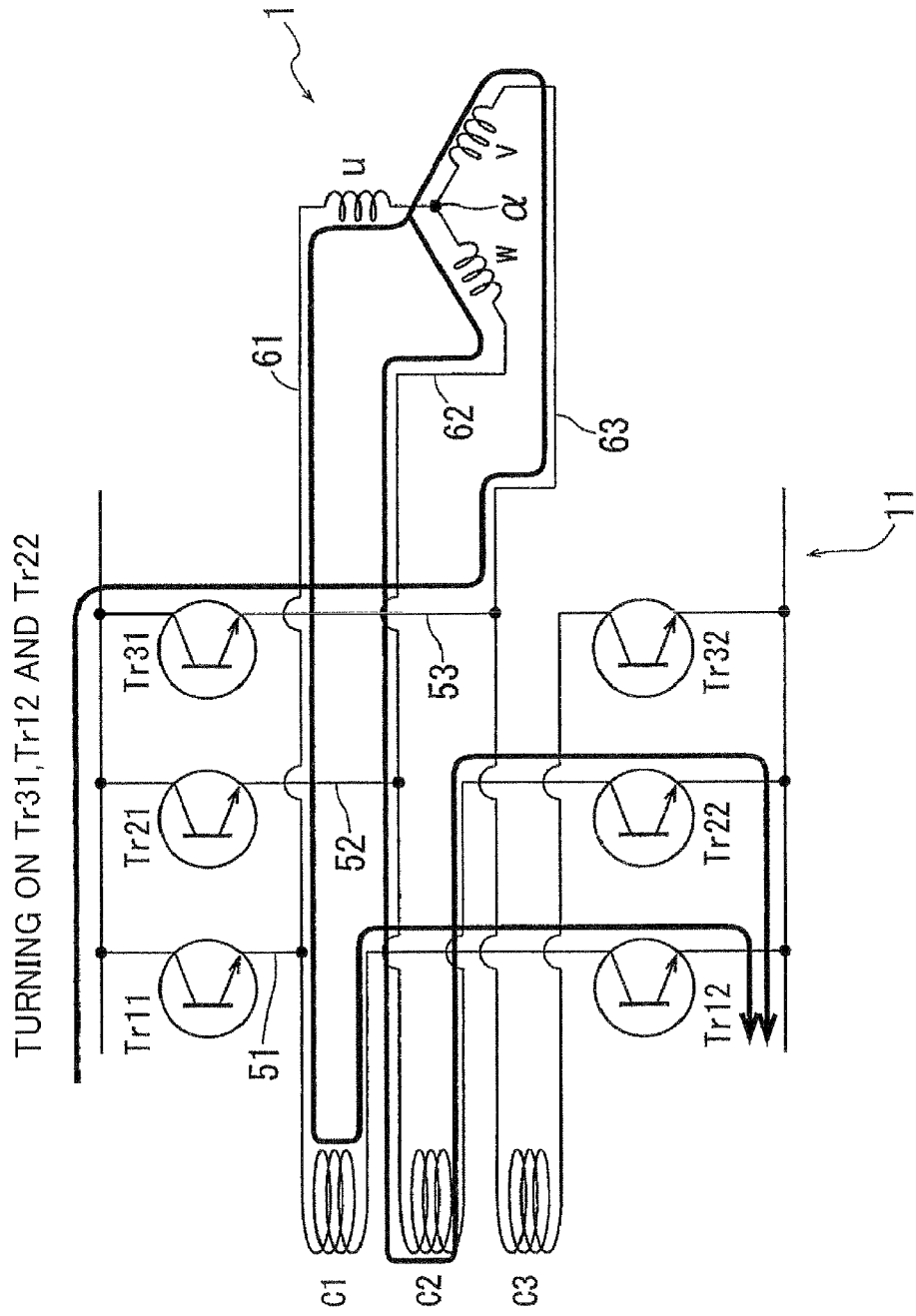
FIG. 36 is an explanatory diagram showing another example of the energization mode for setting the AC motor in the servo lock state, in the induction heating system according to the fifth embodiment.

FIGS. 34 to 36 show three modes for energizing the induction heating coils C1 to C3 while setting the AC motor 1 in a servo lock state to stop the rotational driving thereof. In the fifth embodiment, the servo lock state is achieved by energizing all the electromagnetic coils U, V, W. Specifically, FIG. 34 shows a mode where the three switching elements Tr11, Tr22, Tr32 are turned on. In this mode, the two induction heating coils C2, C3 are energized. FIG. 35 shows a mode where the three switching elements Tr21, Tr12, Tr32 are turned on. In this mode, the two induction heating coils C1, C3 are energized. FIG. 36 shows a mode where the three switching elements Tr31, Tr12, Tr22 are turned on. In this mode, the two induction heating coils C1, C2 are energized. Instead of the modes illustrated in FIGS. 34 to 36, the servo lock state may be achieved by appropriately switching between the energization modes illustrated in FIGS. 28 to 33 depending on a position of the rotor, in such a manner as to prevent the rotor of the AC motor 1 from being rotationally driven.

Figure 37:
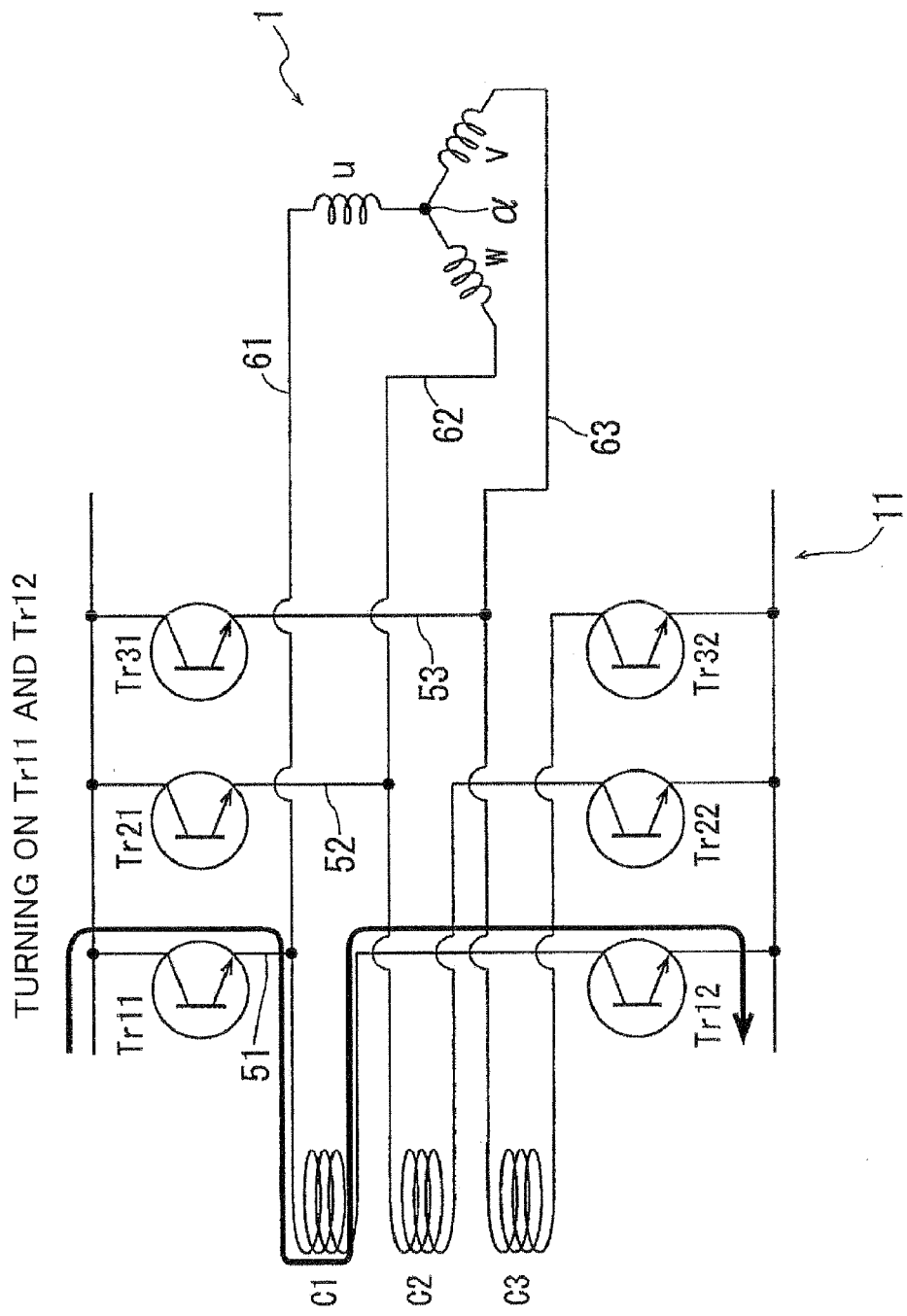
FIG. 37 is an explanatory diagram showing an energization mode for energizing a first one of the induction heating coils, while stopping energization to the AC motor, in the induction heating system according to the fifth embodiment.
Figure 38:
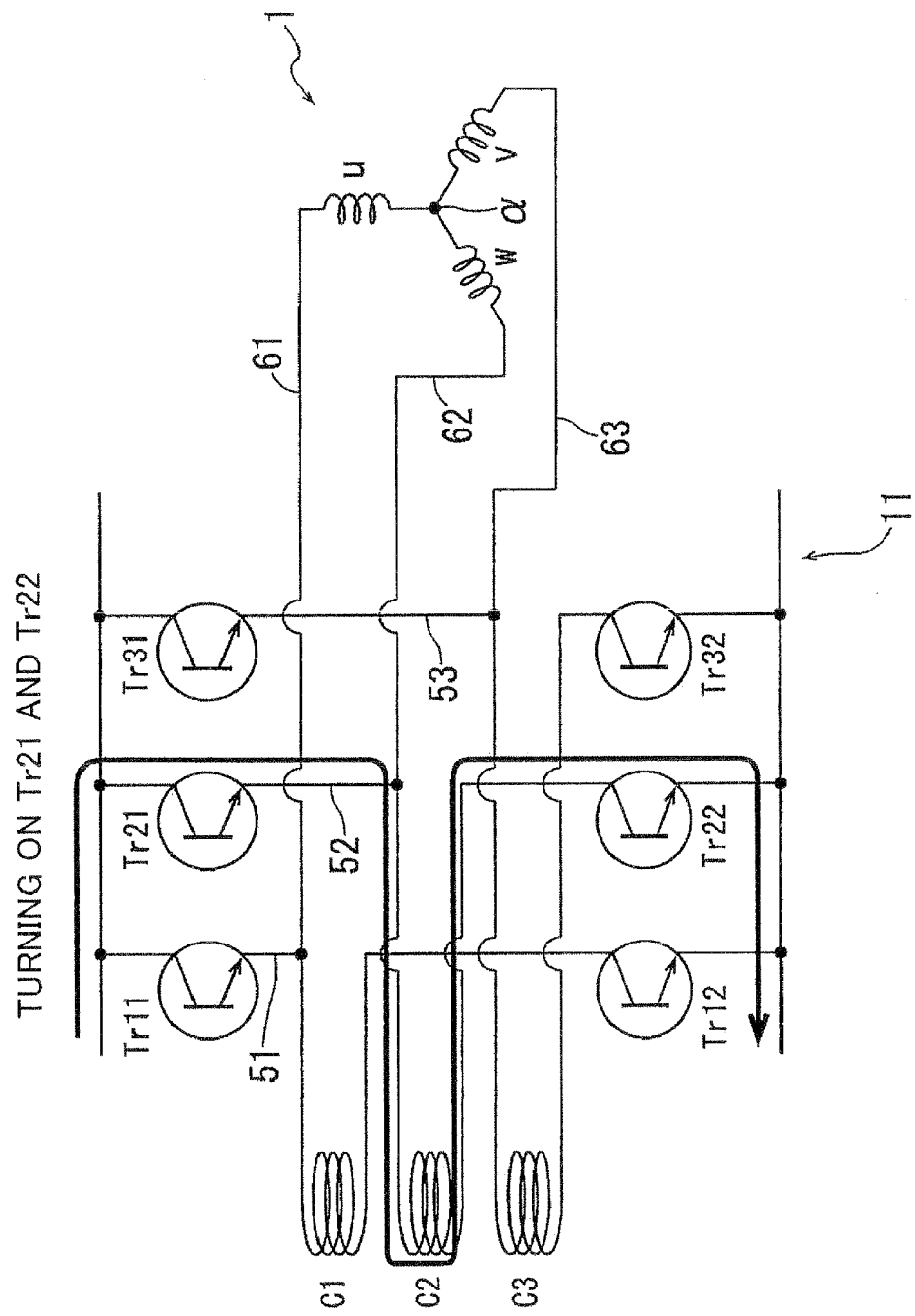
FIG. 38 is an explanatory diagram showing an energization mode for energizing a second one of the induction heating coils, while stopping energization to the AC motor, in the induction heating system according to the fifth embodiment.
Figure 39:
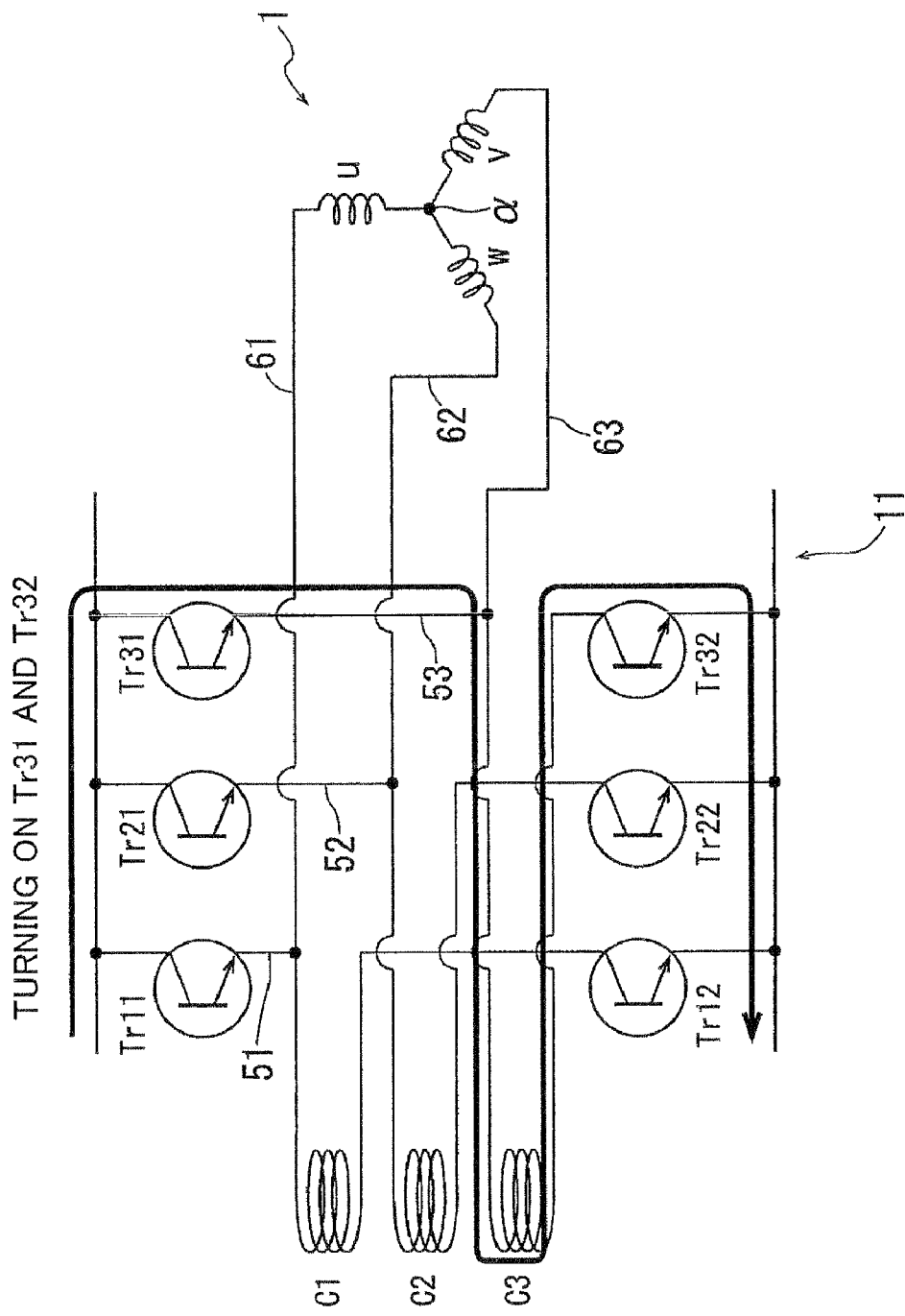
FIG. 39 is an explanatory diagram showing an energization mode for energizing a third one of the induction heating coils, while stopping energization to the AC motor, in the induction heating system according to the fifth embodiment.

FIGS. 37 to 39 show three modes for energizing one of the induction heating coils C1 to C3 without energizing the electromagnetic coils U, V, W of the AC motor 1. Specifically, FIG. 37 shows a mode where the two switching elements Tr11, Tr12 are turned on. In this mode, the induction heating coil C1 is energized. FIG. 38 shows a mode where the two switching elements Tr21, Tr22 are turned on. In this mode, the induction heating coil C2 is energized. FIG. 39 shows a mode where the two switching elements Tr31, Tr32 are turned on. In this mode, the induction heating coil C3 is energized. The modes illustrated in FIGS. 37 to 39 are advantageous in performing induction heating without energizing the electromagnetic coils U, V, W of the AC motor 1, during stopping of the vehicle VC. Even if the two switching elements (Tr11 and Tr12, or Tr21 and Tr22, or Tr31 and Tr32) are simultaneously turned on, a short-circuiting between the positive (+) line and the negative (−) line never occurs, because each of the induction heating coils C1 to C3 is inserted between the two switching elements.

As shown in FIG. 37, even if the two switching elements Tr11, Tr12 are simultaneously turned on, no alternating current is supplied from the DC-AC converter 11 to the AC motor 1, and thereby the AC motor 1 is not rotationally driven. In the same manner, as shown in FIG. 38, even if the two switching elements Tr21, Tr22 are simultaneously turned on, the AC motor 1 is not rotationally driven. Further, as shown in FIG. 39, even if the two switching elements Tr31, Tr32 are simultaneously turned on, the AC motor 1 is not rotationally driven.

That is, each of the three pairs of switching elements (Tr11 and Tr12, or Tr21 and Tr22, or Tr31 and Tr32) have a relationship which causes no supply of alternating current from the DC-AC converter 11 to the AC motor 1 even if they are simultaneously turned on. Each of the pairs of switching elements are connected to each other through a corresponding one of the lines 51, 52, 53. Thus, the lines 51, 52, 53 correspond to a plurality of first lines defined in the appended claims. Further, as shown in FIGS. 28 to 33, each of the lines 61, 62, 63 serves as a line where an alternating current flows during rotational driving of the AC motor 1. Thus, the lines 61, 62, 63 correspond to a plurality of second lines defined in the appended claims. That is, each of the induction heating coils C1, C2, C3 is inserted in a corresponding one of the lines 51, 52, 53 each serving as the first line, and electrically connected to a corresponding one of the lines 61, 62, 63 each serving as the second line, through a part of the corresponding one of the lines 51, 52, 53.

Figure 40:
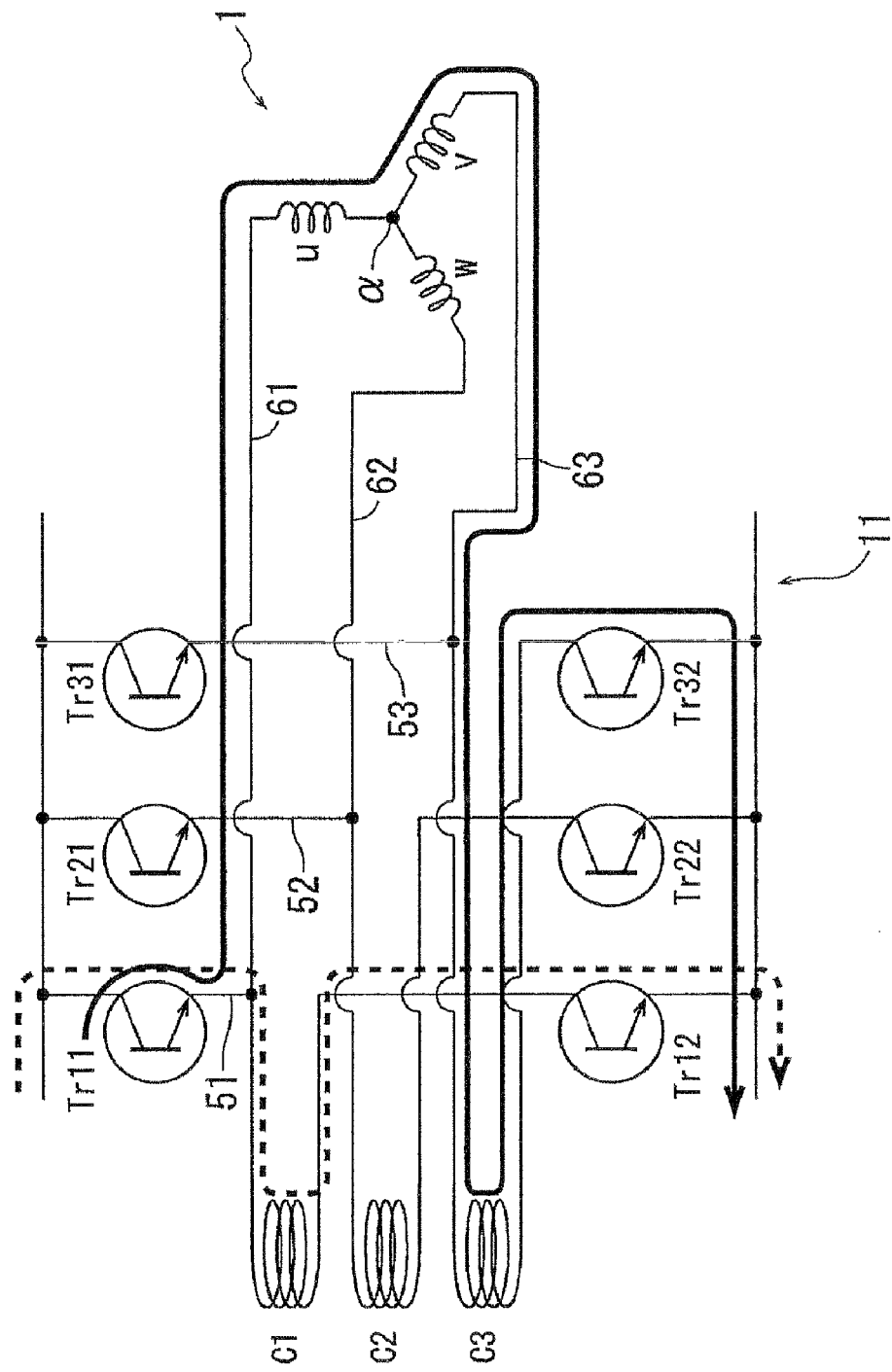
FIG. 40 is an explanatory diagram showing an energization mode for simultaneously energizing two of the induction heating coils, in the induction heating system according to the fifth embodiment.

FIG. 40 shows one example where the energization mode for sequentially energizing the induction heating coils C1 to C3 based on the energization for rotationally driving the AC motor 1 (see the current flow indicated by the solid line in FIG. 40), as shown in FIGS. 28 to 33, is combined with one of the energization modes for energizing only one of the induction heating coils C1 to C3 without energizing the AC motor 1 (see the current flow indicated by the broken line in FIG. 40), as shown in FIGS. 37 to 39. Specifically, in FIG. 40, the energization mode illustrated in FIG. 37 is combined with the energization mode illustrated in FIG. 28 for drivingly rotating the AC motor. In this case, the two induction heating coils C1, C3 are simultaneously energized. Alternatively, two of the three induction heating coils C1 to C3 can also be simultaneously energized by turning on the switching element Tr22 in the mode where the switching element Tr21 is turned on, or turning on the switching element Tr32 in the mode where the switching element Tr31 is turned on. In FIG. 41, the switching element to be additionally turned on to simultaneously energize the two induction heating coils is indicated by the mark "Δ". That is, the switching element indicated by the mark "Δ", which is not used for the energization mode for rotationally driving the AC motor 1, is additionally turned on to allow two of the induction heating coils C1 to C3 to be simultaneously energized while rotationally driving the AC motor 1.

Figure 42:
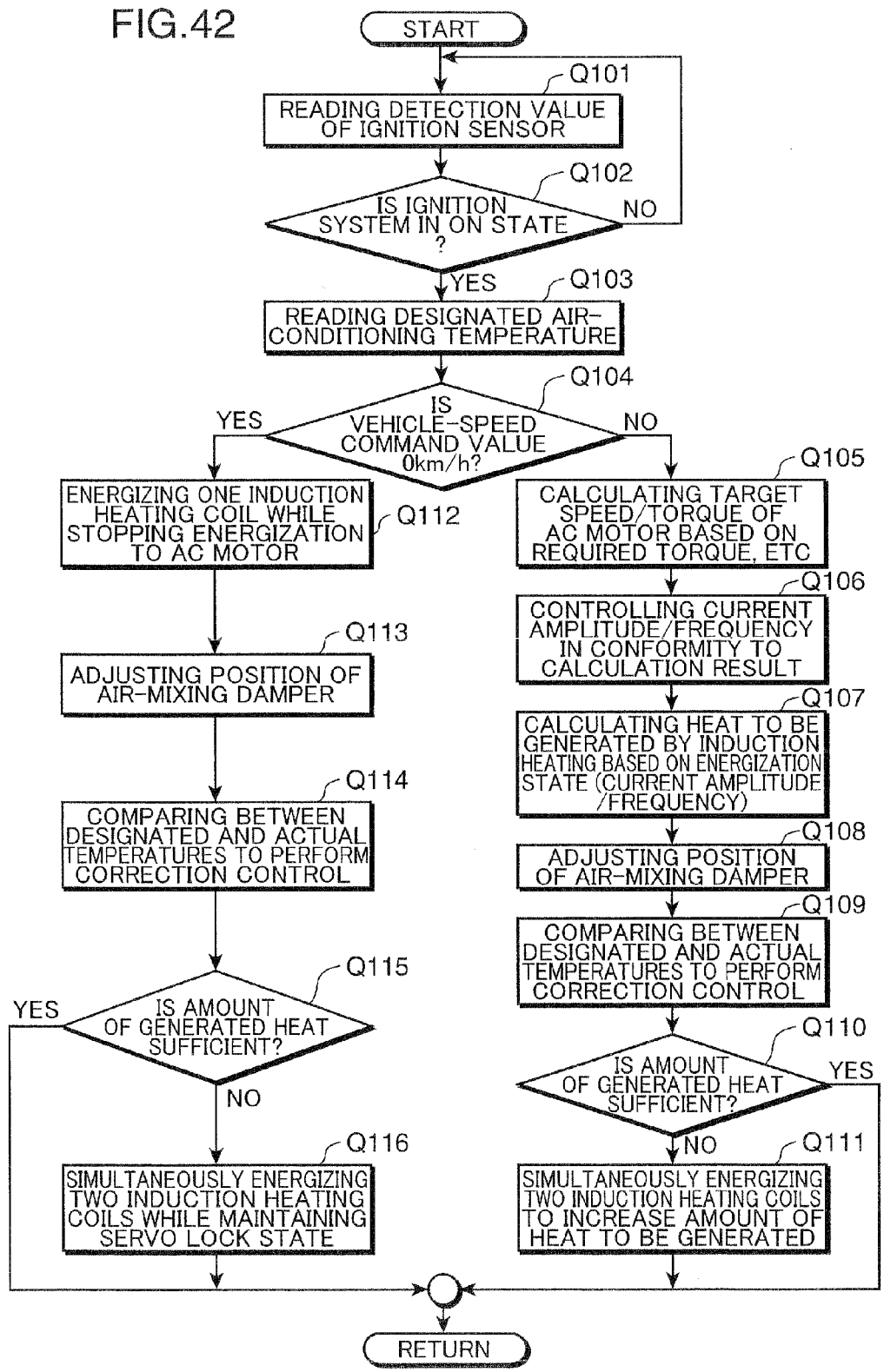
FIG. 42 is a flowchart showing one example of an induction heating control process in the induction heating system according to the fifth embodiment.

FIG. 42 is a flowchart showing one example of a control process of inductively heating the heater core HC using the induction heating coils C1 to C3. Based on this flowchart, the control process will be described below. In the following description, Q means "step". In Q101, a detection value of the ignition sensor S8 is read. Then, in Q102, based on the read detection value, it is determined whether the ignition system is in the ON state. If the determination in Q102 is NO, the routine returned to Q101.

If the determination in Q102 is YES, a designated temperature manually set using the switch S7 is read, in Q103. Then, in Q104, it is determined whether a vehicle-speed command value is zero. Specifically, it is determined whether the vehicle VC is in a stopped state. If the determination in Q104 is NO, it indicates that the vehicle VC is in a running state and it is necessary to drive the AC motor 1. Thus, the controller CU performs a control operation of performing energization to the AC motor 1 in the given order as shown in FIGS. 28 to 33. Specifically, in Q105, a target rotational speed and a target output torque of the AC motor 1 are calculated based on a driving state of the vehicle VC (e.g., an actual vehicle speed, and a required torque corresponding to an actual accelerator pedal angle). Then, in Q106, the AC motor 1 is rotationally driven by an alternating current having an amplitude value and a frequency satisfying a calculation result in Q105.

After Q106, in Q107, an amount of heat to be generated by induction heating sequentially using the induction heating coils C1 to C3 is calculated based on an energization state of the electromagnetic coils U, V, W of the AC motor 1 (the amplitude value and frequency of the alternating current controlled in Q106).

After Q107, in Q108, the position of the air-mixing damper 30 is adjusted based on the read designated temperature. Then, in Q109, the position of the air-mixing damper 30 is corrected based on a difference between the designated temperature and an actual vehicle-interior temperature detected by the sensor S3.

After Q109, in Q110, it is determined whether an amount of heat generated by the induction heating is sufficient. For example, when, despite of the inductive heating based on the calculation in Q107, the engine coolant temperature is not sufficiently high to correct the difference between the designated temperature and the actual vehicle-interior temperature, the amount of heat generated by the induction heating is determined to be not sufficient. If the determination in Q107 is YES (i.e., an amount of heat by induction heating is sufficient), the routine directly returned to Q101. If the determination in Q107 is NO, the mode for simultaneously energizing two of the induction heating coils C1 to C3 is performed in Q111 to increase an amount of heat by induction heating. Specifically, in Q111, the switching elements indicated by "Δ" are additionally activated in conjunction with activating the switching elements indicated by "1" in the order illustrated in FIG. 41, to simultaneously energize two of the induction heating coils C1 to C3 while rotationally driving the AC motor 1. During this operation, either one of the three pairs of switching elements for energizing an additional induction heating coil, i.e., switching elements Tr11 and Tr12, or Tr21 and Tr22, or T31 and T32 may be activated independently. Alternatively, the three pairs of switching elements may be alternatively activated. Further, a selected one or each of the switching elements Tr12, Tr22, Tr32 may be duty-controlled to delicately adjust an amount of heat to be additionally generated.

If the determination in Q104 is YES, it indicates that the vehicle VC is in a stopped state. Thus, in Q112, an operation of energizing only one of the induction heating coils C1 to C3 without energizing the AC motor 1 (i.e., one of the energization modes illustrated in FIGS. 37 to 39) is performed. During this operation, either one of the three pairs of switching elements (i.e., Tr11 and Tr12, or Tr21 and Tr22, or T31 and T32) may be activated independently. Alternatively, the three pairs of switching elements may be alternatively activated. Further, a selected one or each of the switching elements Tr12, Tr22, Tr32 may be duty-controlled to delicately adjust an amount of heat to be additionally generated.

After Q112, processings in Q113 to Q116 are performed. The processings in Q113 to Q115 are identical to the processings in Q108 to Q110. Then, if the determination in Q115 is NO, a processing in Q116 is performed. Differently from Q111, in Q116, an operation of energizing two of the induction heating coils C1 to C3 while setting the AC motor 1 in the servo lock state (i.e., one of the energization modes illustrated in FIGS. 34 to 36) is performed, because the vehicle VC is in the stopped state.

As above, in the induction heating system according to the fifth embodiment, each of the induction heating coils C1 to C3 is inserted in a corresponding one of the lines 51, 52, 53 each connecting two (i.e., Tr11 and Tr12, or Tr21 and Tr22, or Tr31 and Tr32) of the plurality of switching elements of the DC-AC converter 11, wherein the two of the plurality of switching elements have a relationship which causes no supply of alternating current from the DC-AC converter 11 to the AC motor 1 even if the pair of switching elements are simultaneously turned on. Thus, an alternating current from the DC-AC converter 11 can be effectively utilized for induction heating to efficiently heat the heater core HC. In addition, even in the stopped state of the vehicle VC when the energization to the AC motor 1 is stopped, the heater core HC can be inductively heated in an adequate manner by simultaneously turning on the two switching elements having the above relationship to energize only each of the induction heating coils C1 to C3 without energizing the AC motor 1.

Further, in the induction heating system according to the fifth embodiment, each of the induction heating coils C1 to C3 is electrically connected to a corresponding one of the lines 61, 62, 63 where an alternating current flows during rotational driving of the Ac motor 1. Thus, the heater core HC can be inductively heated in an efficient manner by utilizing an alternating current to be supplied to rotationally drive the AC motor 1. Particularly, in the running state of the vehicle VC when the AC motor 1 is rotationally driven, the number of induction heating coils to be energized can be changed depending on the situations, so as to adequately adjust an amount of heat generated by induction heating.

Specifically, the induction heating system according to the fifth embodiment is configured to simultaneously energize two of the induction heating coils C1 to C3 through corresponding pairs of the lines 51, 52, 53 and the line 61, 62, 63 when it is required to further increase a temperature of the heater core HC. Thus, when it is required to further increase the temperature of the heater core HC, the number of induction heating coils to be energized for induction heating can be increased to sufficiently heat the heater core HC.

Sixth Embodiment

Figure 43:
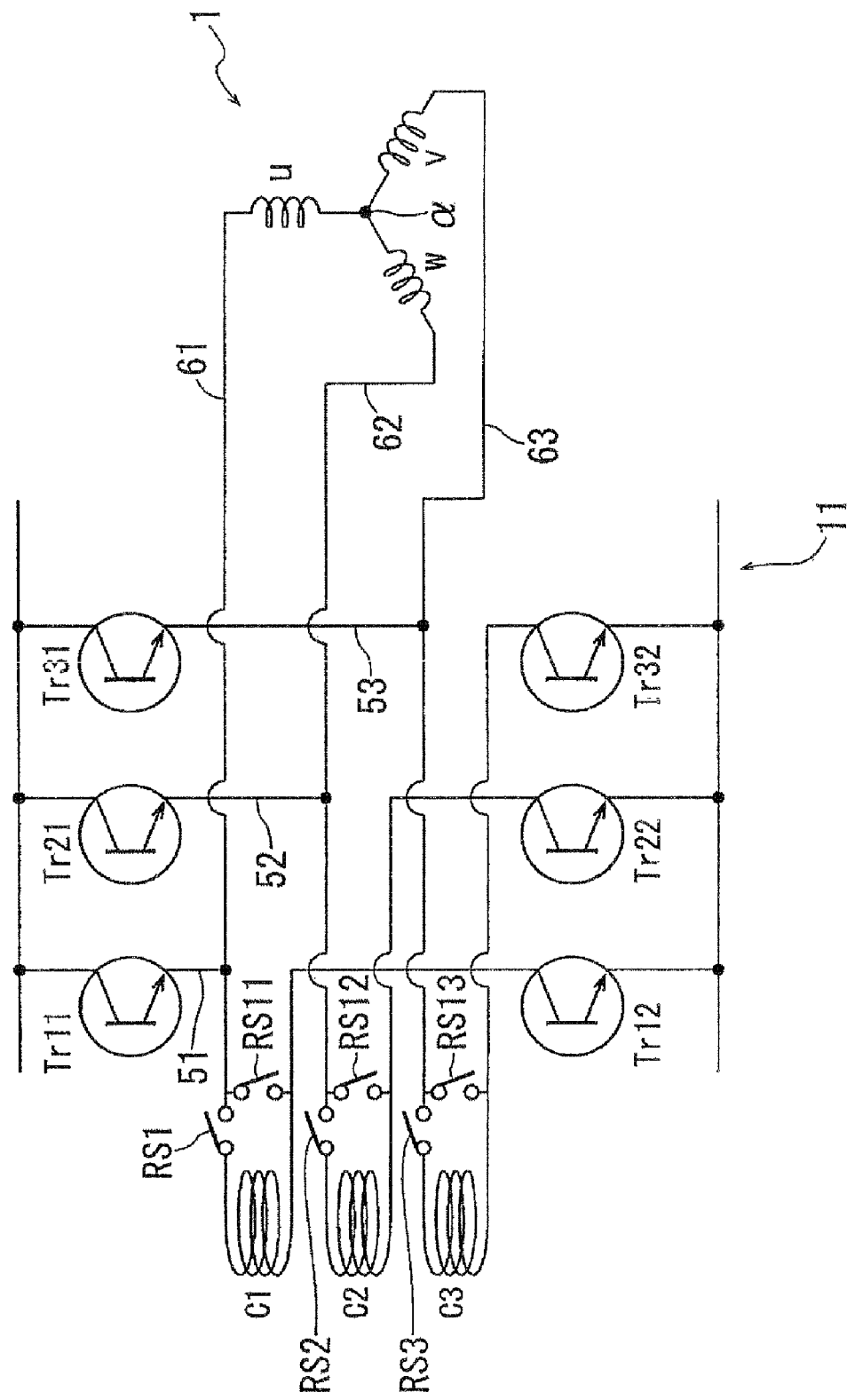
FIG. 43 is an explanatory diagram showing a connection between the AC motor, the three induction heating coils and the DC-AC converter, in an induction heating system according to a sixth embodiment of the present invention.
Figure 44:
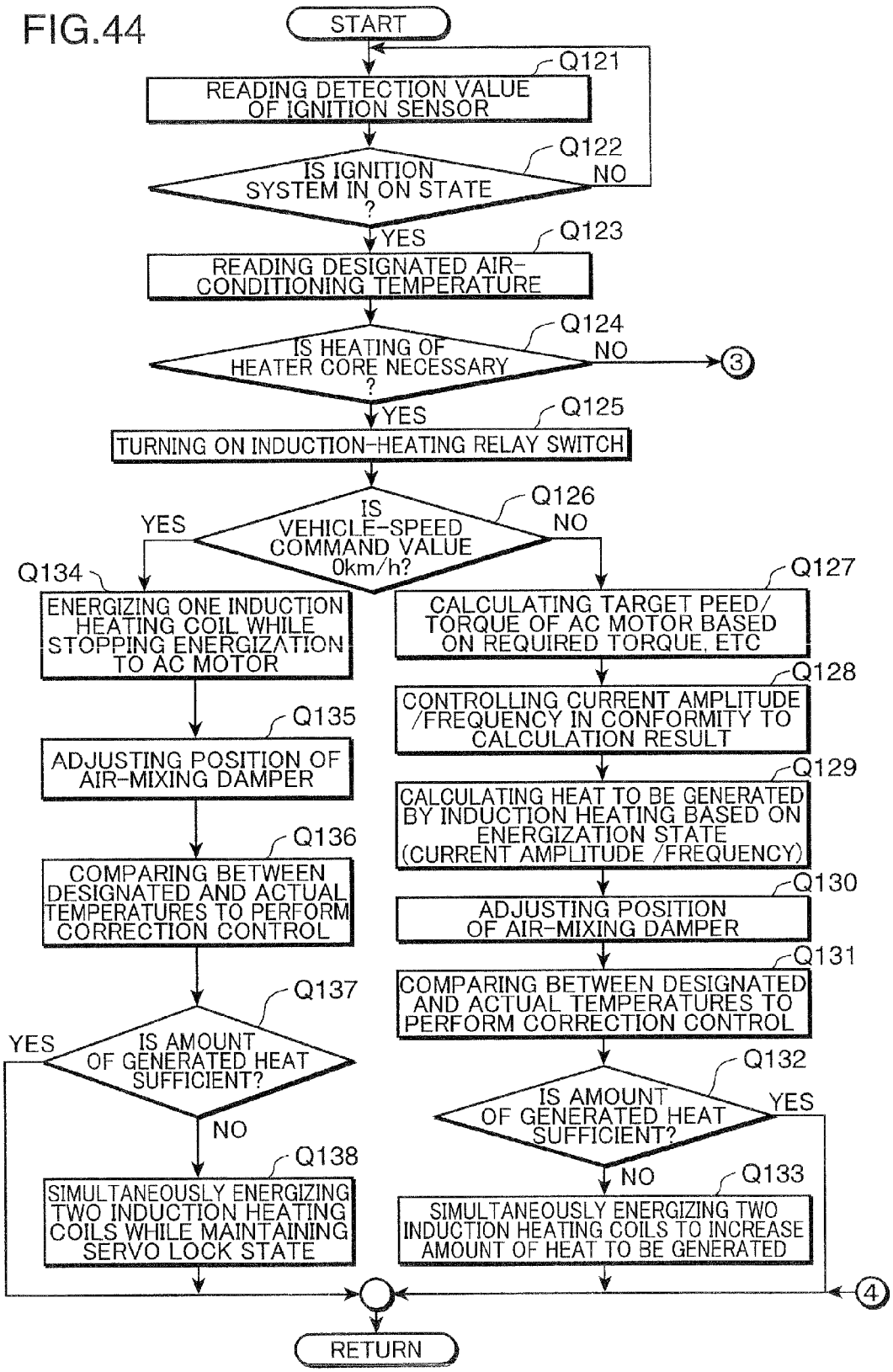
FIG. 44 is a flowchart showing one example of an induction heating control process in the induction heating system according to the sixth embodiment.
Figure 45:
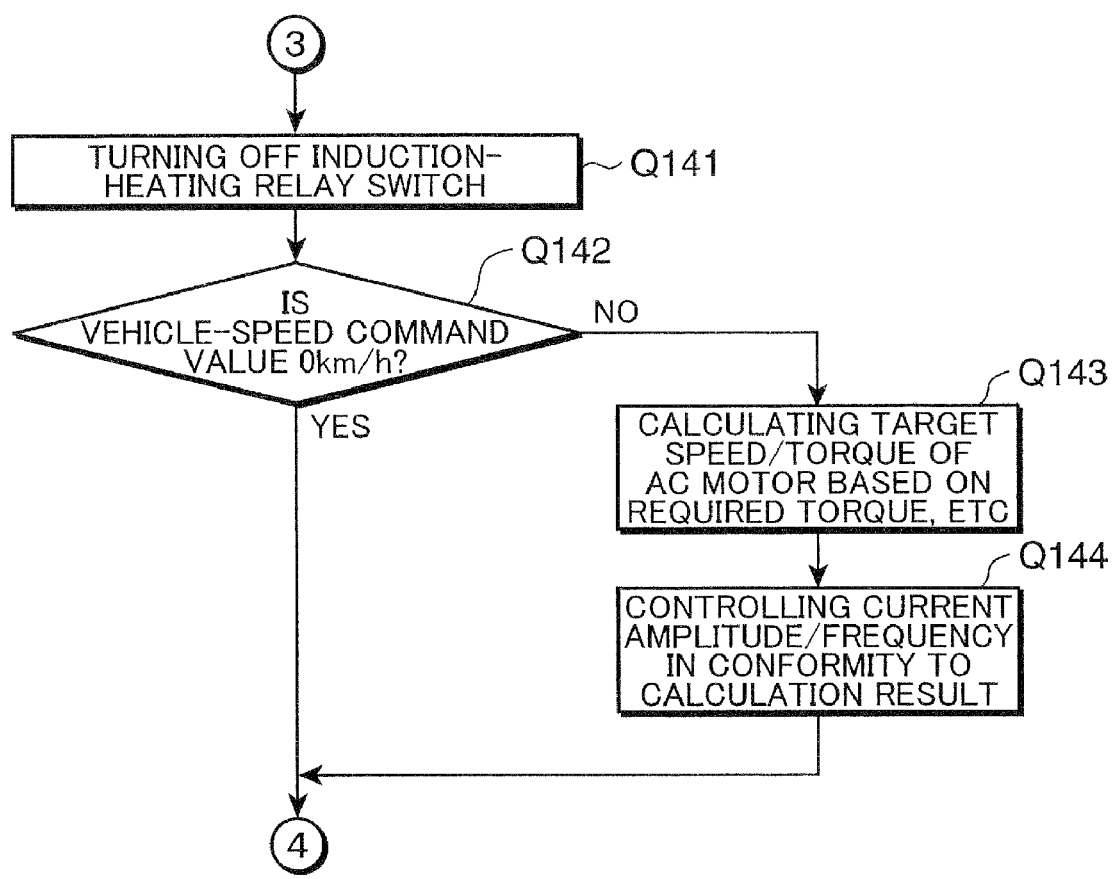
FIG. 45 is a flowchart showing a part of the induction heating control process in FIG. 44.

FIGS. 43 to 45 show an induction heating system according to a sixth embodiment of the present invention. The sixth embodiment is different from the fifth embodiment in that, in order to arbitrarily cut off energization to each of the induction heating coils C1 to C3, each of the induction heating coils C1 to C3 is connected to a corresponding one of the lines 51, 52, 53, for example, via a corresponding one of three relay switches RS1, RS2, RS3, and each of three relay switches RS11, RS12, RS13 is inserted in a line bypassing corresponding ones of the induction heating coils C1 to C3 and the relay switches RS1, RS2, RS3, and operable to selectively connect and disconnect between a corresponding one of the three pairs of switching elements (Tr11 and Tr12; Tr21 and Tr22; and Tr31 and Tr32). Thus, when all the relay switches RS1 to RS3 are turned off, energization to the induction heating coils C1 to C3 is cut off to preclude performing induction heating. That is, when it is unnecessary to inductively heat the heater core HC, energization to the induction heating coils C1 to C3 can be cut off to suppress unwanted power consumption due to the induction heating coils C1 to C3. In the state when all the relay switches RS1 to RS3 are turned off, all the relay switches RS11 to RS13 are turned on to allow the AC motor 1 to be rotationally driven while stopping induction heating.

FIGS. 44 and 45 are a flowchart showing one example of a control process for induction heating using the circuit in FIG. 43. Based on this flowchart, the control process will be described below. The flowchart in FIGS. 44 and 45 includes a common processing to that of the flowchart in FIG. 42. Thus, the following description will be made mainly about a difference from the flowchart in FIG. 42. Further, the following description will be made on the assumption that each of the relay switches RS11 to RS13 corresponding to a respective one of three electromagnetic coils U, V, W is continuously turned on when the ignition system is in the ON state, and turned off when the ignition system is in the OFF state.

Firstly, processings in Q121 to Q122 corresponding to Q101 to Q102 in FIG. 42 are performed. After Q123, in Q124, it is determined whether it is necessary to inductively heat the heater core HC. For example, in Q124, when the engine coolant temperature is sufficiently greater than the designated temperature or when the vehicle-interior temperature is equal to or greater than the designated temperature, the induction heating is determined to be unnecessary (i.e., NO), whereas, under any other conditions, the induction heating is determined to be necessary (i.e., YES). If the determination in Q124 is YES, all the induction-heating relay switches RS1 to RS3 are turned on in Q125. After Q125, processings in Q126 and subsequent steps will be performed, wherein Q126 to Q133 are identical to Q104 to Q111 in FIG. 42, and Q 134 to 138 are identical to Q112 to Q116 in FIG. 42.

If the determination in Q124 is NO, all the induction-heating relay switches RS1 to RS3 are turned off. Subsequently, processings in Q142 to Q144 will be performed, wherein Q142 to Q144 are identical to Q104 to Q106 in FIG. 42 (also identical to Q126 to Q128 in FIG. 44). After Q142 to Q144, the routine returns to Q121 in FIG. 44.

As described above, in the induction heating system according to the sixth embodiment, when induction heating is unnecessary, energization to the induction heating coil C can be cut off using the relay switches RS1 to RS3 to effectively reduce power consumption.

Although the preferred embodiments of the present invention have been described, the present invention is not limited to such specific embodiments, but various changes and modifications may be made therein without departing from the scope of the present invention hereinafter defined. For example, the engine 12 may be used as a driving source of the vehicle VC in at least a part of operation states of the vehicle VC (for example, one driving mode where the vehicle VC is driven by both the engine 12 and the AC motor 1, and another driving mode where the vehicle VC is driven by only the AC motor 1, may be switched therebetween depending the operation states of the vehicle VC). It is understood that the present invention may be applied to a motor-driven vehicle having no engine. The target component to be inductively heated is not limited to a heater core HC as in the above embodiments, but may be an exhaust gas purifying catalyst provided in an exhaust passage of the engine 12. In this case, the exhaust gas purifying catalyst can be quickly heated up to an activation temperature. Further, in the induction heating systems according to the above embodiments, the induction heating coil C (C1 to C3) can be disposed outside the exhaust passage (around an outer periphery of the exhaust gas purifying catalyst). This is desirable for avoiding an increase in resistance to flow of exhaust gas, as compared with a case where a heater is disposed inside the exhaust passage to warm the exhaust gas purifying catalyst. Further, the target component to be inductively heated may be any other suitable component, such as a vehicle seat (in this case, the induction heating coil C (C1 to C3) is used for warming the seat), or an electric pot as vehicle-interior equipment. The number of phases of the polyphase-type AC motor may be two, or four or more. It is understood that an object of the present invention is not limited to the explicitly described object, but impliedly intended to provide a feature which is substantially expressed as a desirable effect/function or an advantage.

In the last place, features and advantages of the present invention disclosed based on the above embodiments will be described in a summarized manner.

The present invention provides an induction heating system for inductively heating a target component mounted to a motor-driven vehicle. The induction heating system comprises a polyphase-type alternating current motor adapted to drive the vehicle, an electrical storage device which stores an electric power to be supplied to the alternating current motor, a DC-AC converter adapted to convert a direct current from the electrical storage device into an alternating current and supply the alternating current to the alternating current motor, and an induction heating coil adapted to receive a supply of the alternating current from the DC-AC converter, to inductively heat the target component.

In the induction heating system of the present invention, the DC-AC converter inserted between the electrical storage device and the alternating current motor can be effectively used as a converter for induction heating to eliminate a need for providing an additional converter exclusively for induction heating. Obviously, the induction heating is advantageous in improving energy efficiency and in heating the target component in an overall area thereof.

Preferably, in the induction heating system of the present invention, the induction heating coil is inserted in a line extending from a neutral point of the alternating current motor.

According to this feature, induction heating can be performed during driving of the alternating current motor by use of only a single induction heating coil without providing a plurality of induction heating coils corresponding to respective phases of the polyphase-type alternating current motor.

Preferably, in the induction heating system of the present invention, the DC-AC converter includes a plurality of switching elements, and the induction heating coil includes a plurality of induction heating coils inserted in respective ones of a plurality of first lines each connecting at least two of the plurality of switching elements, wherein the at least two switching elements have a relationship which causes no supply of alternating current from the DC-AC converter to the alternating current motor even if the at least two switching elements are simultaneously turned on.

According to this feature, even in a stopped state of the vehicle when the energization to the alternating current motor is stopped, the target component can be inductively heated in an adequate manner by simultaneously turning on the at least two switching elements having the above relationship to energize each of the induction heating coils without energizing the alternating current motor.

More preferably, each of the induction heating coils is electrically connected to a respective one of a plurality of second lines where an alternating current flows during rotational driving of the alternating current motor.

According to this feature, induction heating can be efficiently performed by utilizing an alternating current to be supplied to rotationally drive the alternating current motor. Particularly, in a running state of the vehicle when the alternating current motor is rotationally driven, the number of induction heating coils to be energized can be changed depending on the situations, so as to adequately adjust an amount of heat generated by induction heating.

Preferably, the above induction heating system is configured to simultaneously energize at least two of the induction heating coils through corresponding pairs of the first lines and the second lines when it is required to further increase a temperature of the target component.

According to this feature, when it is required to further increase the temperature of the target component, the number of induction heating coils to be energized for induction heating can be increased to sufficiently heat the target component.

Preferably, the induction heating system of the present invention is configured to inductively heat the target component during stopping of the vehicle, under a condition that the induction heating coil is energized while setting the alternating current motor in a servo lock state.

According to this feature, induction heating can be performed without rotationally driving the alternating current motor.

Preferably, the induction heating system of the present invention comprises switch means operable to selectively cut off energization to the induction heating coil.

According to this feature, when induction heating is unnecessary, energization to the induction heating coil can be cut off to effectively reduce power consumption.

In the induction heating system of the present invention, the target component may be a heater core for air-conditioning.

In this case, a vehicle-interior space can be efficiently warmed by induction heating. In addition, the induction heating coil can be arranged without interfering with an internal passage of the heater core where air-conditioning air passes. This is advantageous in reducing a resistance to flow of the air-conditioning air.

In the induction heating system of the present invention, when the vehicle is equipped with an internal combustion engine adapted to be driven as one driving source of the vehicle, in at least a part of operation states of the vehicle, the target component may be an exhaust gas purifying catalyst provided in an exhaust passage of the internal combustion engine.

In this case, the exhaust gas purifying catalyst can be inductively heated to quickly achieve an activated state thereof. Further, the induction heating coil can be arranged outside the exhaust passage. This is desirable for avoiding an increase in resistance to flow of exhaust gas.

This application is based on three (3) Japanese Patent Application Nos. 2008-069227, 2008-069228, and 2008-069229, filed in Japan Patent Office, all on Mar. 18, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An induction heating system for inductively heating a target component mounted to a motor-driven vehicle, comprising:
   a polyphase-type alternating current motor adapted to drive the vehicle;
   an electrical storage device which stores an electric power to be supplied to the alternating current motor;
   an DC-AC converter adapted to convert a direct current from the electrical storage device into an alternating current, and supply the alternating current to the alternating current motor; and
   an induction heating coil adapted to receive a supply of the alternating current from the DC-AC converter, to inductively heat the target component,
   said DC-AC converter having:
     a positive terminal;
     a negative terminal;
     a plurality of first lines connected in parallel between said positive terminal and said negative terminal;
     two switching elements inserted in series in each of said plural first lines;
     said induction heating coil inserted between said two switching elements in series along said each of said plural first lines such that said two switching elements has a relationship which causes no supply of alternating current from the DC-AC converter to the alternate current motor even if said two switching elements are simultaneously turned on;
     wherein said polyphase-type alternating current motor has a plurality of electromagnetic coils each of which is electrically connected to respective one of said induction heating coil via a respective one of plurality of second lines.

2. The induction heating system as defined in claim 1, wherein:
   the DC-AC converter includes a plurality of switching elements; and
   the induction heating coil includes a plurality of induction heating coils inserted in respective ones of a plurality of first lines, each connecting said two of the plurality of switching elements, said switching elements having a relationship which causes no supply of alternating current from the DC-AC converter to the alternating current motor even if said switching elements are simultaneously turned on.

3. The induction heating system as defined in claim 2, wherein each of the induction heating coils is electrically connected to a respective one of a plurality of second lines where an alternating current flows during rotational driving of the alternating current motor.

4. The induction heating system as defined in claim 3, which is configured to simultaneously energize at least two of the induction heating coils through corresponding pairs of the first lines and the second lines when it is required to further increase a temperature of the target component.

5. The induction heating system as defined in claim 1, which is configured to inductively heat the target component during stopping of the vehicle, under a condition that the induction heating coil is energized while setting the alternating current motor in a servo lock state.

6. The induction heating system as defined in claim 1, further comprising a switch operable to selectively cut off energization to the induction heating coil.

7. The induction heating system as defined in claim 1, wherein the target component is a heater core for air-conditioning.

8. The induction heating system as defined in claim 1, wherein the vehicle is equipped with an internal combustion engine adapted to be driven as one driving source of the vehicle, in at least a part of operation states of the vehicle, wherein the target component is an exhaust gas purifying catalyst provided in an exhaust passage of the internal combustion engine.

* * * * *